US00RE34159E

United States Patent [19]

Harrington et al.

[11] E Patent Number: Re. 34,159

[45] Reissued Date of Patent: Jan. 12, 1993

[54] ELECTRIC MOTOR CONTROLLERS

[75] Inventors: Christopher A. Harrington, Staffordshire; Dennis M. Jones, Devon, both of England

[73] Assignee: Chloride Group Public Limited Co., London, England

[21] Appl. No.: 843,281

[22] Filed: Feb. 28, 1992

Related U.S. Patent Documents

Reissue of:

[64] Patent No.: 5,040,088
Issued: Aug. 13, 1991
Appl. No.: 598,786
Filed: Oct. 17, 1990

U.S. Applications:

[63] Continuation of Ser. No. 253,025, Oct. 4, 1988, abandoned.

[30] Foreign Application Priority Data

Oct. 5, 1987 [GB] United Kingdom ..... 8723364

[51] Int. Cl.[5] ..... H02H 3/17

[52] U.S. Cl. ..... 361/31; 361/58; 361/93; 361/87; 324/523; 340/644

[58] Field of Search ..... 361/33, 86, 90, 31, 361/58, 93, 87; 324/522, 523; 340/644

[56] References Cited

U.S. PATENT DOCUMENTS 4,150,413 4/1979 Nerem ..... 361/86
4,441,136 4/1984 Hampshire ..... 361/88
4,633,358 12/1986 Nagano ..... 361/31

*Primary Examiner*—Todd E. DeBoer
*Attorney, Agent, or Firm*—Finnegan, Henderson, Farabow, Garrett and Dunner

[57] ABSTRACT

An electric motor controller comprises a circuit for selecting between driving and braking an electric motor in accordance with the health or otherwise of a pair of main electric motor control switches (14 and 16). In a preferred embodiment the health of the switch is determined by the voltage (A) between the switches. The controller also comprises apparatus for detecting the sense of movement of the motor. In the event that the motor is moving in a sense opposite to that selected, the apparatus increase field current to reduce the armature current thereby increasing the braking effect of the motor. Also in the controller are apparatus for changing from armature to field current control and vice versa, in response to a given magnitude of control signal. In order to provide an unambiguous change-over, a lock-out circuit is provided to inhibit change-over in a transition region. The lockout circuit maintains the mode of control to above/beneath the change-over level when changing from one level to another. The controller has a drive circuit which uses a flywheel inductor to provide an enhanced actuating signal for a transistor control switch for the motor. In a first state, the inductor is connected to by-pass the transistor to build-up a flywheel current. In a second state, the flywheel current is arranged to be applied to the transistor as a spike input.

12 Claims, 17 Drawing Sheets

MOTOR CONTACTOR
FIELD INHIBIT
8D
9D
7D
5D
37D
28D
36D
13D
1D
N
-7·05V
+7·05V
35V
+4V
-10A
128
129
130
131
191
201
202
203
204
208
210
110
108
112
102
104
XD

ELECTRIC MOTOR CONTROLLERS

Matter enclosed in heavy brackets [ ] appears in the original patent but forms no part of this reissue specification; matter printed in italics indicates the additions made by reissue.

This application is a continuation of application Ser. No. 07/253,025 filed Oct. 4, 1988 abandoned.

This invention relates to controllers for electric motors. The invention is particularly, though not exclusively, applicable to a control circuit for an electric traction motor for a vehicle.

Control systems for electric motors, for example separately excited direct current (d.c.) motors, which are used as traction motors in vehicles are known in which a variable mark/space ratio rectangular wave is used to control sets of silicon controlled rectifiers (SCR's). The SCR's are arranged in the circuit of the electric motor to control both the speed and power output of the motor by regulating the voltage across the armature winding and the excitation current applied to the field winding.

The connection of the armature winding can be changed in relation to its battery supply so that the motor acts as a regenerative brake which charges the battery while decelerating the vehicle.

However, SCR's suffer from some disadvantages. Firstly, they are prone to miscommutation due to noise.

Secondly, they require a large amount of peripheral circuitry which makes the controllers relatively expensive to manufacture.

Known control circuits do not allow a smooth and yet rapid transition between controlling the traction motor to drive the vehicle in a motoring mode and retard it in a braking mode.

It has also been proposed to control a traction motor by means of power transistors. However, power transistors have only found application in specialised functions. The control systems developed to drive them have been complex and not easily suited to cost effective production in the large numbers required to satisfy the potential electric vehicle market.

According to a first aspect of the invention there is provided an electric-motor controller arranged to operate in a first mode variably to control the armature current of an electric motor by varying the armature voltage and in a second mode variably to control the armature current by varying the field current, comprising control means arranged to produce, a signal representative of an input demand signal, change over means arranged to operate in response to the control signal to change between modes, and offset means arranged to apply an offset biassing signal to the control signal when the controller is in a given mode.

Preferably, the given mode is the second mode. The offset means may also be arranged to operate in response to the control signal, for example in response to a particular control signal DC level. DC level detection means may be provided for that purpose.

Conveniently, the control signal is applied to an integrator. In such a case, the offset means and the switching means may be arranged to operate in response to an output of the integrator.

The control means may be arranged to produce the control signal in dependence upon a motor feedback signal representative of the motor operation.

Desirably, the motor feedback signal is representative of the armature current. The control means may be arranged to produce, as the control signal, an error signal representative of the difference.

The control signal or integrated control signal may be applied to armature current control means arranged to vary the armature current in dependence upon the applied signal. The armature current control means may include means for varying the effective armature voltage when the controller is in the first mode, and means for varying the field current when it is in the second mode. Conveniently, the armature voltage is chopped by means of a variable chopper circuit. The chopper circuit may comprise a comparator arranged to receive, as inputs, the control signal or integrated signal and an oscillatory waveform, (desirably a sawtooth). In such an arrangement, the offset means may be arranged to apply the holding signal when the DC level of the control signal or integrated control signal reaches the upper or lower edge of the oscillatory waveform.

In one embodiment, the controller is arranged to control the currents so as selectively to drive or to brake the motor. In this embodiment the offset holding signal is a different polarity depending upon whether the motor is being driven or braked. Thus, the integrated DC control signal is respectively pulled below or above the level of the oscillatory waveform.

Separate circuits may be provided for controlling the current according to whether the motor is being driven or braked, each arranged to operate in response to the control, or integrated control signal. Each circuit may include its own chopping comparator, preferably receiving an oscillatory input from a common source. This allows the controller to move from driving to braking without the use of complex switching circuitry thereby providing a rapid and smooth transition.

The rapid transition may be assisted by the provision of a discharge resistor across the integrator. This provides rapid discharge of the integrator capacitor.

According to a second aspect of the invention there is provided an electric-motor controller comprising detecting means arranged to detect when the motor is moving in a direction opposite to that selected, and field control means arranged to operate in response to an output of the detecting means to vary the field current to tend to enhance electrical braking.

Preferably the controller comprises means arranged to produce a signal representative of a selected vehicle direction. Such an arrangement is particularly useful when the motor is being forced in the reverse direction by a vehicle in which the motor is contained rolling back, on a hill for example or when the current in an armature of an electric motor to be controlled is excessive. In either case damage to the motor and/or controller could occur.

If the motor is forced against its selected direction, back-current or emf may build up which could damage the circuitry. Accordingly, first means may be provided which are arranged to increase the field current in order to prevent excessive armature current. Conveniently, second means for actuating, for example, a contactor in series with the motor armature, is provided to open the contactor in the event that the first means fails to arrest motion of the motor sufficiently. The second means may be arranged to operate in dependence upon the armature voltage or alternatively the armature current. In this event, it is preferable that the field current is reduced before the contactor is actuated.

According to a third aspect of the invention an electric load controller comprises first switch means selectively operable in response to a control signal to control the load and switch test means, connected to monitor the condition of the first switch means and arranged to inhibit the controller if the first switch means is faulty.

It may be that the controller comprises second switch means, connected in series with the first switch means, each of which switch means are selectively operable in response to the control signal to control the motor for electrical driving and/or braking.

Preferably, the switch test means is operable in response to the voltage at the junction between the switch means; alternatively, it may be operable in response to a current signal. In either case, the switch test means may be arranged to inhibit start-up if the voltage or current falls outside specified limits. Effectively the switch test means detects whether there is an excessive leakage current through either of the switch means, on start-up.

If the junction is also connected to the motor armature, via a contactor, this arrangement provides for contactor proving without the need for a microswitch.

Preferably, the switch test means is arranged to detect whether the voltage at the junction falls outside a predetermined range, for example 40 to 60 percent, of the voltage across both switches, and to provide an output inhibit signal if it does so. The voltage at the junction may be located in the desired range, when the switch means are healthy, by the provision of first and second by-pass means connected respectively across the first and second switch means. The by-pass means are desirably resistors.

Further test means may be provided, responsive to the voltage across both switch means, to inhibit start-up if the said voltage falls below a desired value, for example if the main battery voltage is too low.

According to a fourth aspect of the invention an electric-motor controller comprises first switch means selectively operable in response to a drive control signal from drive control means to control a motor for driving; second switch means selectively operable in response to a braking control signal from brake control means to control a motor for braking; and lockout means, responsive to a lockout signal representative of the drive control and braking control signals, arranged selectively to inhibit the first switch means or the second switch means according as the motor is respectively braking or being driven.

Preferably, the drive control means and the braking control means are arranged to operate in response to a common control signal. This control signal may be an integrated error signal provided from control means arranged to produce the control signal in dependence upon an input demand signal, and desirably further in dependence upon a feedback signal representative of the actual motor operation. The drive control means and the braking control means conveniently each comprise a variable mark/space generator, the mark/space ratio being arranged to vary in dependence upon the control, or integrated control, signal.

The lockout signal may be derived from a summation of the drive control and braking control signals, for example from a variable resistance chain extending between the outputs of the drive and braking control means, the summing means being constituted by amplifying means, to an input of which the drive and braking control signals are applied. The lockout means may comprise voltage-detector means arranged to inhibit one of the switch means if the lockout signal is higher than a first reference value and to inhibit the other switch means if the lockout signal is lower than a second reference value. The second value is desirably higher than the first, thereby creating a small voltage-region at the intermediate point at which neither switch means is actuated.

The lockout means may comprise first and second comparators, arranged to detect values of the lockout signal respectively higher or lower than first and second reference values, and arranged to output respective inhibit signals in response thereto.

According to a fifth aspect of the invention a drive circuit for electronic switch means comprises a flywheel inductor arranged, when the electronic switch means is in a first state, to carry a flywheel current, and flywheel current switch means arranged to divert the path of inductor current thereby switching the electronic switch means to a second state.

Preferably, the drive circuit also comprises further circuit switch means which are switchable to establish a current flow in the flywheel inductor before the electronic switch means are switched to the second state. In this case it is desirable that the circuit also comprises delay means which are operable to actuate the flywheel current switch means after the further circuit switch means, on receipt of a switch control signal, to switch the electronic switch means to the second state.

Preferably, the drive circuit is arranged to control the current flow within a motor.

The flywheel current switch means may be controlled by a current or voltage signal derived from one side of the flywheel inductor. Desirably, where the electronic switch means is a power transistor, the base thereof may be connected directly to the inductor.

The flywheel current switch means may also carry the flywheel current. The flywheel current switch means may be for example, a bipolar transistor receiving the actuating signal at its base, or an FET receiving the signal at its gate. The flywheel current may flow from a current source, through the inductor, through the flywheel switch means to a current sink. Alternatively, the flywheel switch means could be on the other side of the inductor.

The delay means may comprise a charging or discharging capacitor, the voltage of which is compared in a comparator with a reference level to produce the actuating signal.

The electronic switch means may be arranged to revert to the first state by at least some of the current through the inductor being diverted instead along an alternative current path. This may be conveniently achieved by the actuation of second further circuit switch means in the alternative path, thereby allowing current to flow along that path instead of through the inductor. The resultant change in inductor current or voltage may be applied to the switch means to switch it to its first state. The second further circuit current switch means may be a transistor arranged to operate in response to the switch control signal.

The switch means may be arranged to vary the currents in the motor armature and/or field winding.

According to a sixth aspect of the invention an electric vehicle includes an electric traction motor arranged to be controlled by a controller as previously defined, preferably including a drive circuit as previously defined.

The polarity of a demand signal may be used to determine whether to connect the motor for driving or for braking.

The controller may include brake switching means arranged to operate in response to the control signal selectively to control a motor for driving or for electrical braking.

The control means may be arranged to produce the control signal in dependence upon a motor feedback signal representative of the motor operation. Desirably the motor feedback signal is representative of the achieved armature current, and the demand signal is representative of the desired armature current. The control means may be arranged to produce, as the control signal, an error signal representative of the difference.

A specific embodiment of the present invention will now be described by way of example with reference to the accompanying drawings in which.

Figure 1:
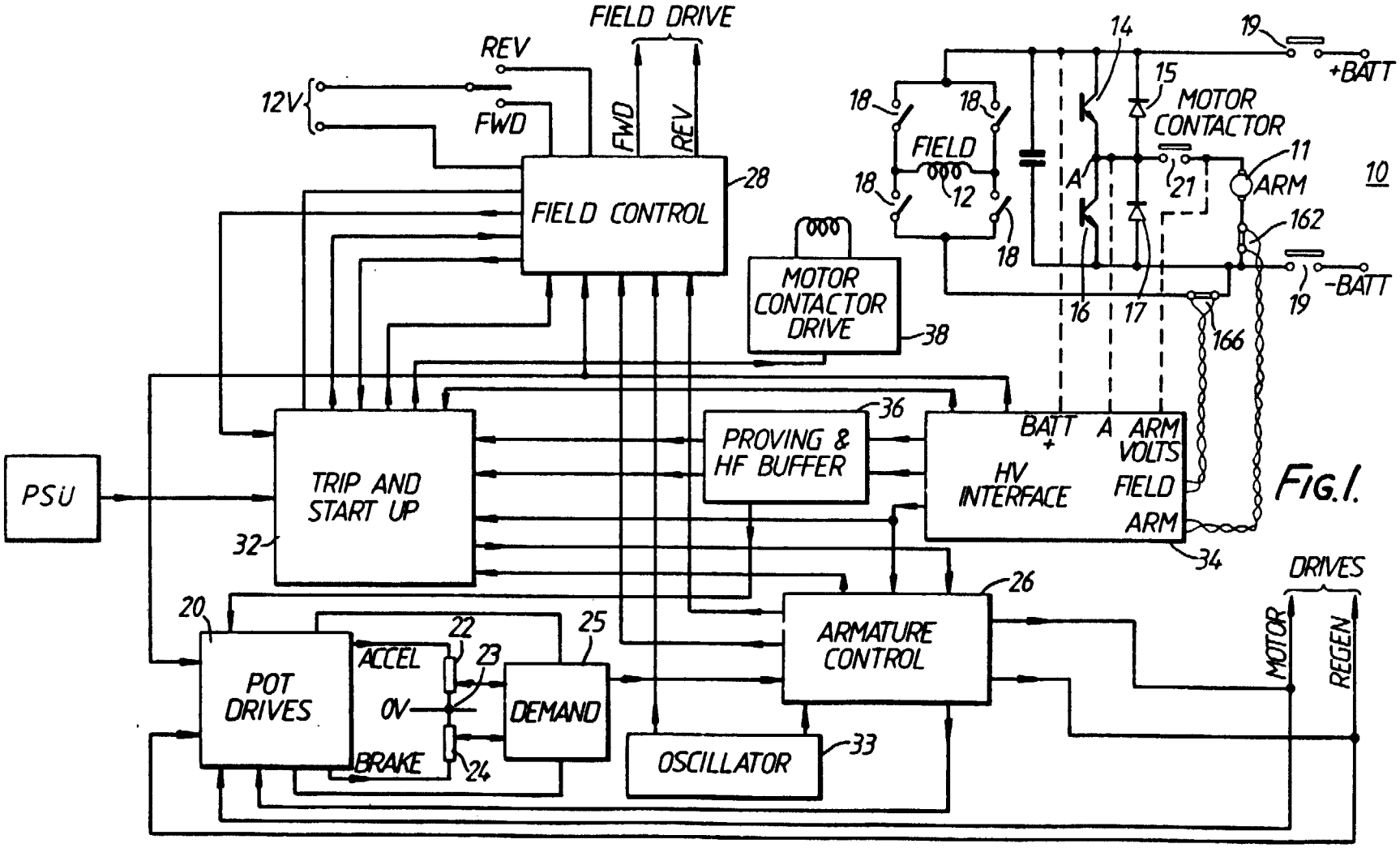
FIG. 1 is a schematic block diagram of a controller embodying the present invention.

Referring firstly to FIG. 1 of the drawings, a battery 10 is connected across the terminals of an armature winding 11 of a traction motor and the terminals of a shunt connected separately controlled field winding 12.

The voltage applied to the armature winding 11 is controlled by a pulse width modulated motor power transistor 14 in series with the positive terminal of the battery and the armature 11 and a regenerative braking power transistor 16 bridging the armature 11. The power transistors 14 and 16 are each driven by a chopper drive circuit (not shown) which applies a pulse width modulating signal to the base of the respective power transistor to control the effective voltage applied across the armature winding 11, when the motor is connected to drive a vehicle, or across the battery when it is connected to act as a regenerative brake.

The two power transistors 14 and 16 are respectively provided with integral, reverse-connected diodes 15 and 17 connected in series across the battery supply. Pulsing the motor power transistor 14 will control the driving power, with flywheel current passing through the diode 17 packaged with the braking power transistor 16. Regenerative braking control is achieved by pulsing the braking power transistor 16 with current flowing back to charge the battery via the diode 15 packaged with the motor power transistor 14. Very rapid transitions between motoring and braking are therefore possible without contactor delay and the complexity of contactor proving associated with conventional power switching arrangements. Contactors 19 and 21 are used for isolation and for isolation and gross overcurrent protection respectively.

A master sawtooth oscillator 33 is provided to synchronise the chopper waveforms, as will be described in more detail later.

A safety trip and start circuit 32, to be described later, monitors the condition of the controller, the electric motor and the battery 10. High voltage signals are relayed from the motor to the trip and start circuit through a high voltage interface 34 and a proving buffer 36.

In the event that certain safety conditions are not met, the trip and start circuit will trip the motor, or prevent it being started at all, by actuating the main motor contactor 21 through a drive circuit 38.

The battery 10 is also connected to a group of four power transistors 18 connected around the field winding 12 in an integrated package in a full bridge configuration. Again, the transistors 18 are each actuated by a separate pulse width modulating chopper drive circuit (not shown). By actuating two diagonally opposite transistors 18 the field can be excited to run the motor in the forward or reverse directions. This gives the controller the ability to reverse the field rapidly without the disadvantage of using active contactor switching.

A motoring or braking demand signal is applied, respectively, to a motoring or a braking potentiometer 22 or 24 by a driver of a vehicle in which the traction motor and control system are installed (for example by means of a foot pedal). The applied signal is limited by means of a potentiometer drive circuit 20 which restricts the maximum demand level output available according to the prevailing operating conditions. The motor potentiometer 22 is supplied with a relatively positive voltage with respect to a zero voltage reference point 23. The braking potentiometer 24 is supplied by the potentiometer drive circuit 20 with a relatively negative voltage with respect to the zero voltage point 23.

The outputs of both the potentiometers 22 and 24 are supplied to a demand conditioning circuit 25 which sums the positive motor and negative regenerative braking signals in the event that they should appear together, to derive a single overall demand signal which is then applied to an armature control circuit 26. The armature control circuit 26, in turn, supplies pulse width modulating chopper control signals to the motor and braking power transistors 14 and 16 through the motor and braking chopper drive circuits.

It is not possible adequately to control the speed of the traction motor solely by varying the armature voltage. Once the limit of armature control has been reached, the control system is arranged to effect control of the motor speed by weakening the field current thus reducing the voltage across the armature winding 11. The armature control circuit 26 is thus connected to actuate a field control circuit 28 which is also operable to reconfigure the direction of current flow through the field winding 12 to drive the motor in the forward or reverse direction. Above a certain speed, commutation in the motor will start to break down and cause damage to the commutator. This can be overcome by gradually limiting the maximum demanded armature current at high speeds.

Figure 2A:
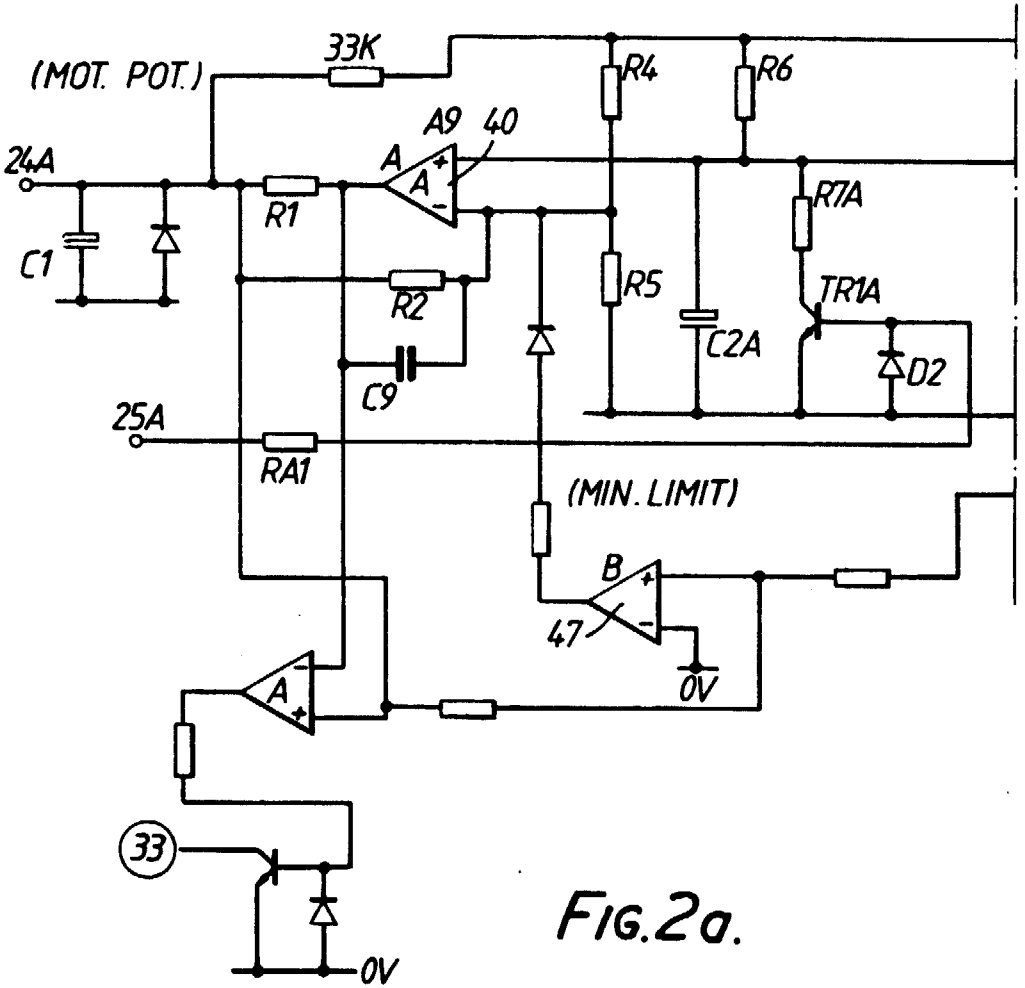
FIGS. 2a, 2b is a circuit diagram of a potentiometer control circuit incorporated in the circuit of FIG. 1.
Figure 2B:
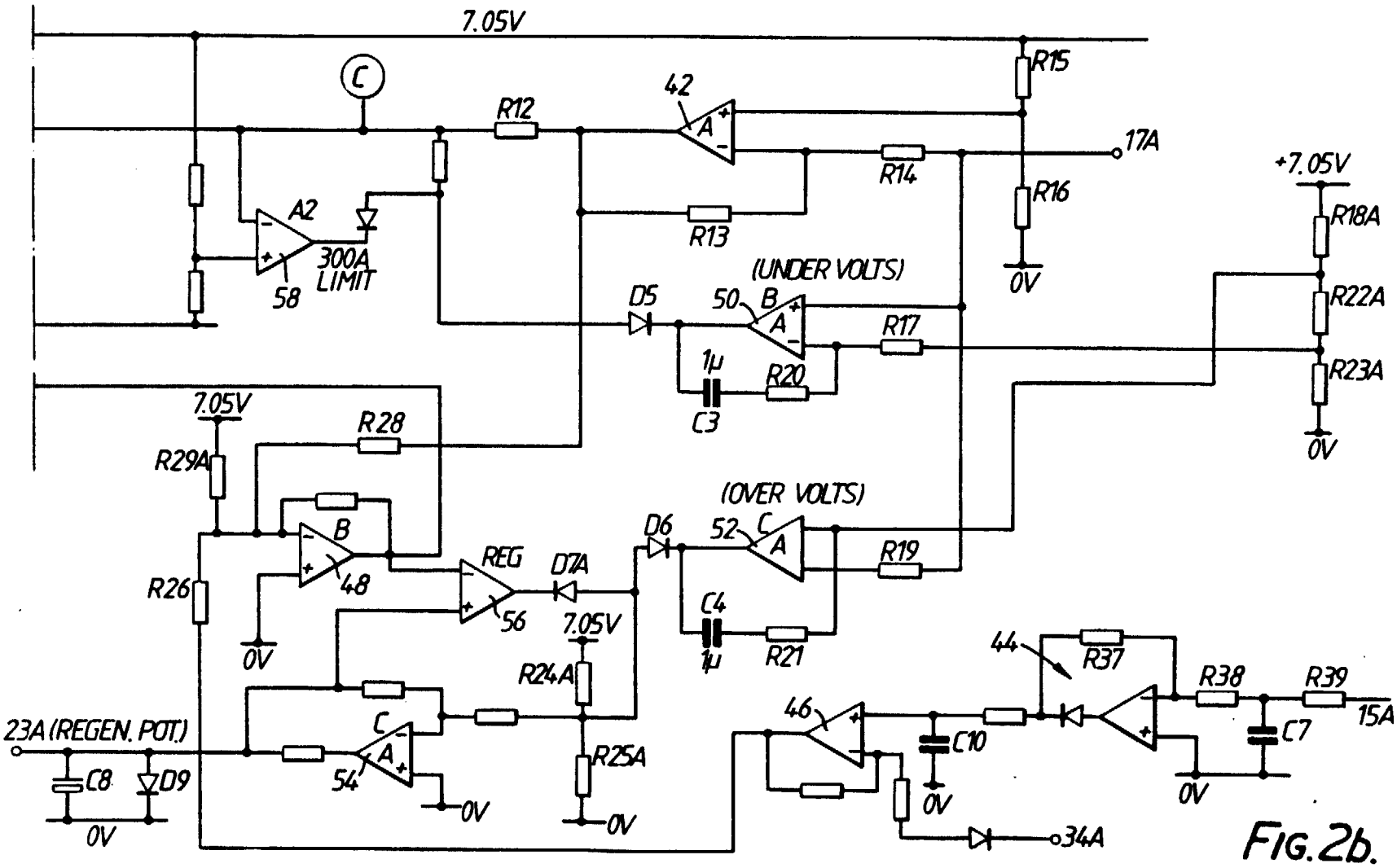

Referring to FIG. 2, the potentiometer drive circuit 20 receives an input of the analogue battery voltage on a pin 17A, the analogue field current level on a pin 15A, a high or low signal signifying how the controller is controlling the speed of the motor, i.e. by chopping the armature current or controlling the field current, on a pin 34A, and an input reflecting the mark/space chopper control signal at the motor power transistor drive output of the armature control circuit on a pin 25A.

The battery voltage signal on the pin 17A is applied to the inverting input of a pre-amplifying and offset establishing amplifier 42. It is necessary to choose the correct voltage swing for the battery level signal. Too small a swing will be prone to noise, and too large a swing will tend to saturate the other components; so the range is optimised by choosing a suitable intermediate band and an offset midpoint about which the voltage can swing.

In order to maintain the power output from the electric motor when connected in a motoring mode, it is necessary to compensate for a varying battery voltage level by adjusting the armature current. Thus the maximum demand will be increased as the battery voltage signal on the pin 17A falls.

The output of the amplifier 42 is then applied to the non-inverting input of an output amplifier 40 which governs the maximum range available at the motoring potentiometer 22.

As can be seen from FIG. 1, the output on the pin 24A is applied to one end of the motoring potentiometer 22, the other end being connected to zero volt at point 23.

The variable mark/space rectangular wave voltage on the pin 25A is applied to the non-inverting input of the output amplifier 40 through a transistor TR1A. The waveform of this signal is smoothed by a capacitor C2A connected between the collector of the transistor TR1A, through a resistor R7A, and zero potential.

A comparator 58 has the output of the output amplifier 42 connected to its inverting input, i.e. the voltage at a point C. When the equivalent of a maximum demand signal on the output is above a safe limit (equivalent, for example, to 300 amps), the comparator 58 output goes negative with respect to the input to the output amplifier 42, dragging the available maximum demand back within the safe limit and thus restricting the maximum available output demand. The comparator 58 also serves to restrict the available demand when the vehicle is accelerating, to limit the torque available from the electric motor, in the same manner.

When the main motor power transistor 14 is maintained fully on (so-called d.c operation), the analogue signal of the field current on the pin 15A is applied to the inverting input of a single polarity rectifying amplifier 44 and thence to the non-inverting input of an enabling amplifier 46. The input d.c. signal on the pin 34A enables the amplifier 46 and allows the field current signal to be applied to the inverting input of a summing amplifier 48 which sums the output of the amplifier 46, equivalent to the field current; the output of the amplifier 42, equivalent to the battery voltage; and an offset provided from between the positive rail through a resistor R29A, all connected to the inverting input of the amplifier 48. The summed output of the amplifier 48 is an inverse signal amplified in accordance with the value of a resistor 22kA. The output of the amplifier 48 is connected to the non-inverting input of an amplifier 47, the output of which is connected to the inverting input of the output amplifier 40. Thus, the output of the summing amplifier influences the maximum voltage level on the demand potentiometer 22 in d.c. operation. When the magnitude of the output on the pin 24A equals the magnitude on the output from the summing amplifier 48, the output of the amplifier 47 is low. However, once the output on the pin 24A exceeds that of the summing amplifier 48 the output of the amplifier 47 goes high which restricts the possible demanded level at the output of the output of amplifier 40 and thus the output on the pin 24A.

When the main braking power transistor 16 is maintained in chop operation, the output of the summing amplifier 48, applied to the inverting input of a braking d.c. scheduling amplifier 56, is more negative than a set bias level, derived from between resistors R24A and R25A serially connected between the positive rail and zero, on the inverting input of a regenerative output amplifier 54. The output of the amplifier 54 is connected to the non-inverting input of the scheduling amplifier 56. In this event, the positive output of the scheduling amplifier 56 is blocked by a reverse biased diode D7A on the output.

In d.c. operation, however, the level at the inverting input becomes more positive than the bias voltage and the diode D7A conducts due to the negative output voltage. Thus, the maximum output of the output amplifier 54, connected to a pin 23A, is thus influenced by the level of the field current and the battery voltage, similarly to the motor output on the pin 24A. The level on the pin 23A limits the maximum braking demand from the braking potentiometer 24 (FIG. 1) to one end of which it is connected.

The battery level signal on the pin 17A is also applied to the non-inverting input of an under-voltage amplifier 50. The battery level signal is compared with a preset positive voltage applied to the inverting input derived from the resistance network comprising resistors R18A, R22A and R23A, between the positive supply rail and zero potential.

When the battery level signal is below that relating to a safe working voltage, the amplifier 50 will apply a low signal to the non-inverting input to the output amplifier 40, thus preventing a positive output on the pin 24A, and disabling the motor drive.

In order to prevent damage to the battery 10 in the braking mode through over-charging, the battery level signal is also connected from the pin 17A to the inverting input of an over-voltage protection amplifier 52. The amplifier 52 has a preset level bias signal applied to its non-inverting input through a connection between the resistors R18A and R22A of the chain of resistors R18A, R22A and R23A connected in series between the positive supply rail and the zero potential. The output of the over-voltage comparator 52 is a negative going signal which is applied to the inverting input of the braking output amplifier 54 to limit the amount of maximum braking signal that can be demanded of the braking potentiometer 24.

Thus, the motor signal output on the pin 24A varies between zero and a variable positive maximum voltage and the braking signal output on the pin 23A varies between zero and a varying maximum negative voltage.

Figure 3:
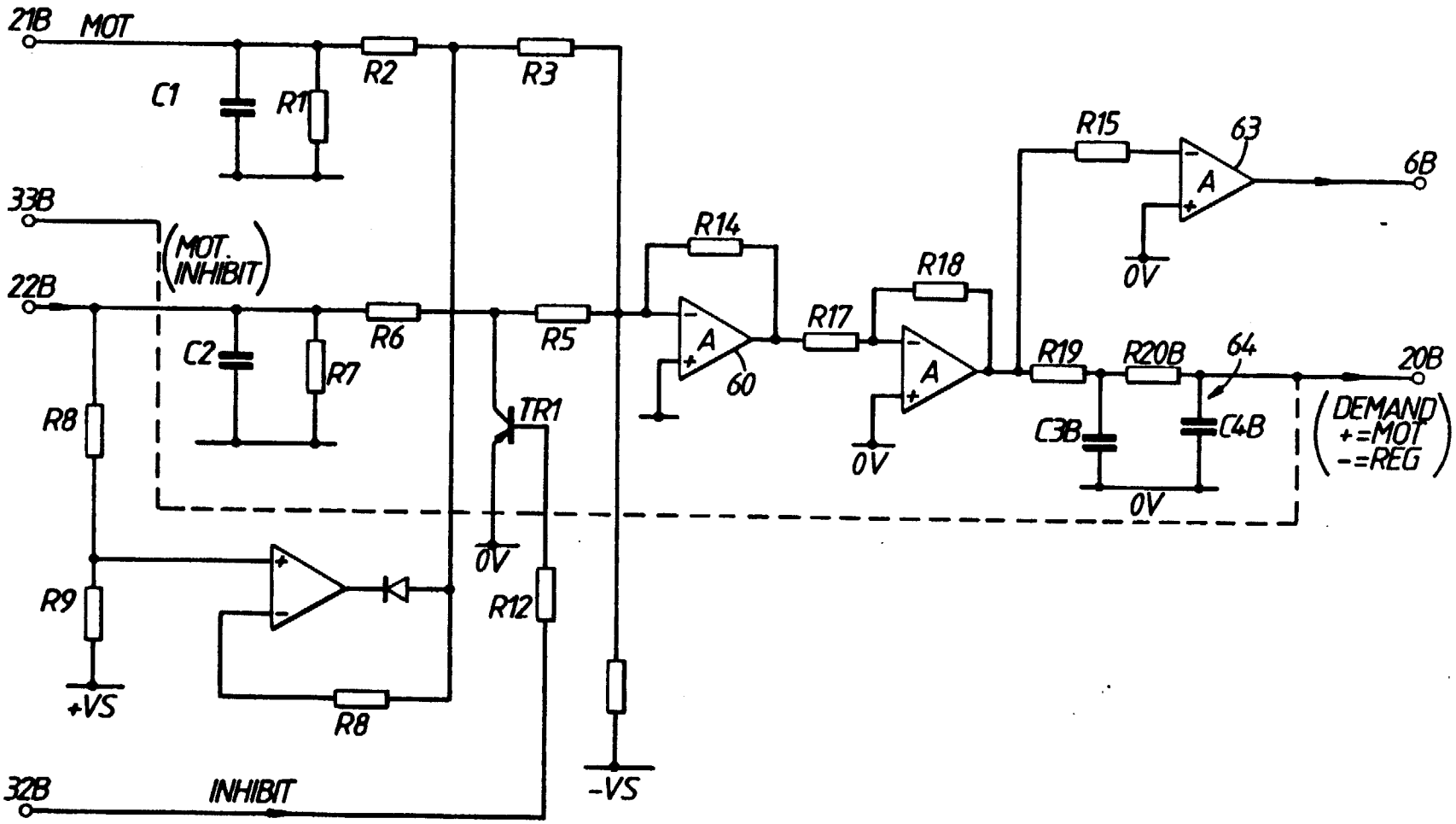
FIG. 3 is a circuit diagram of a demand conditioning circuit incorporated in the circuit of FIG. 1.

Turning back to FIG. 1 for a moment, it will be seen that the variable outputs of the wipers of the potentiometers 22, 24 are connected to input pins 21B and 22B, respectively of the demand conditioning circuit 25, which will now be described with reference to FIG. 3.

Dealing firstly with a positive motor voltage signal on the pin 21B, the signal is applied to the inverting input of a conditioning pre-amplifier 60. The output of the pre-amplifier 60 is connected to the inverting input of a unity gain inverting buffer 62. The output of the buffer 62 is applied to a low pass filter 64, comprising a series connected resistor R20B and two capacitors C3B and C4B connected on either side of the resistor R20B to zero potential.

The double inversion cf the motor signal on the pin 21B thus results in a conditioned positive motor demand signal on an output pin 20B connected to the output of the filter 64.

Negative voltage braking signals from the wiper of the braking potentiometer 24 are received on the pin 22B. As with the motor signals, these are applied to the inverting input of the conditioning amplifier 60 and likewise a negative filtered and conditioned braking signal voltage is received at the pin 20B.

In the event that both motoring and braking signals are supplied, the pre-amplifier 60 provides a summed output.

The output of the buffer 62 is also applied to the inverting input of a switch coupled amplifier 63 which provides convenient signals for other parts of the controller to signify by their polarity whether the demand signals are motor or braking in nature.

In order to maintain the motor in a safe condition under no-signal conditions, a large value resistor 1MB is connected between the inverting input to the conditioning amplifier 60 and the negative supply rail. In this way a slight negative bias is maintained which simulates a small braking signal at all times.

Figure 4A:
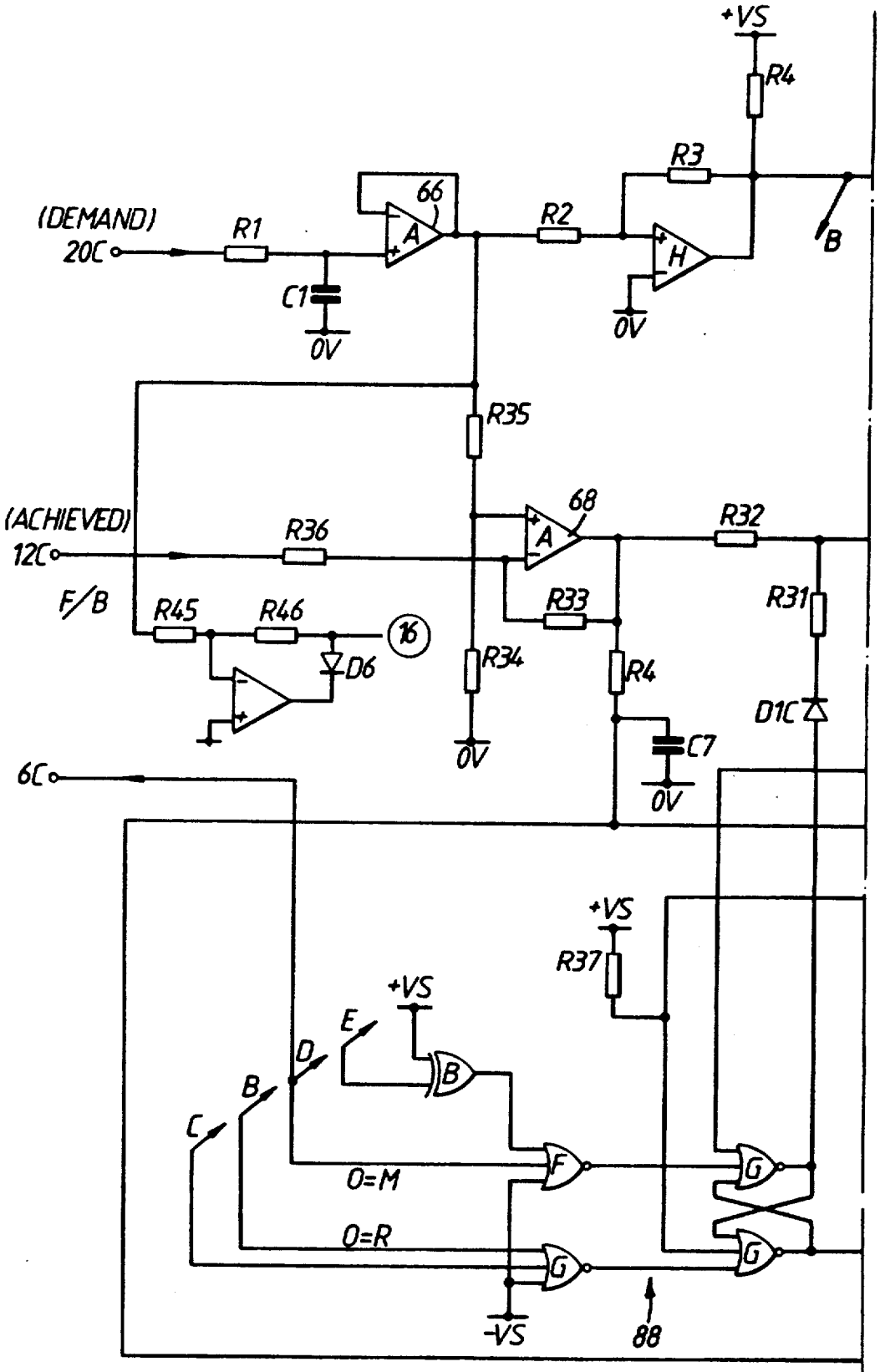
FIGS. 4a–4c is a circuit diagram of an armature control circuit incorporated in the circuit of FIG. 1.
Figure 4B:
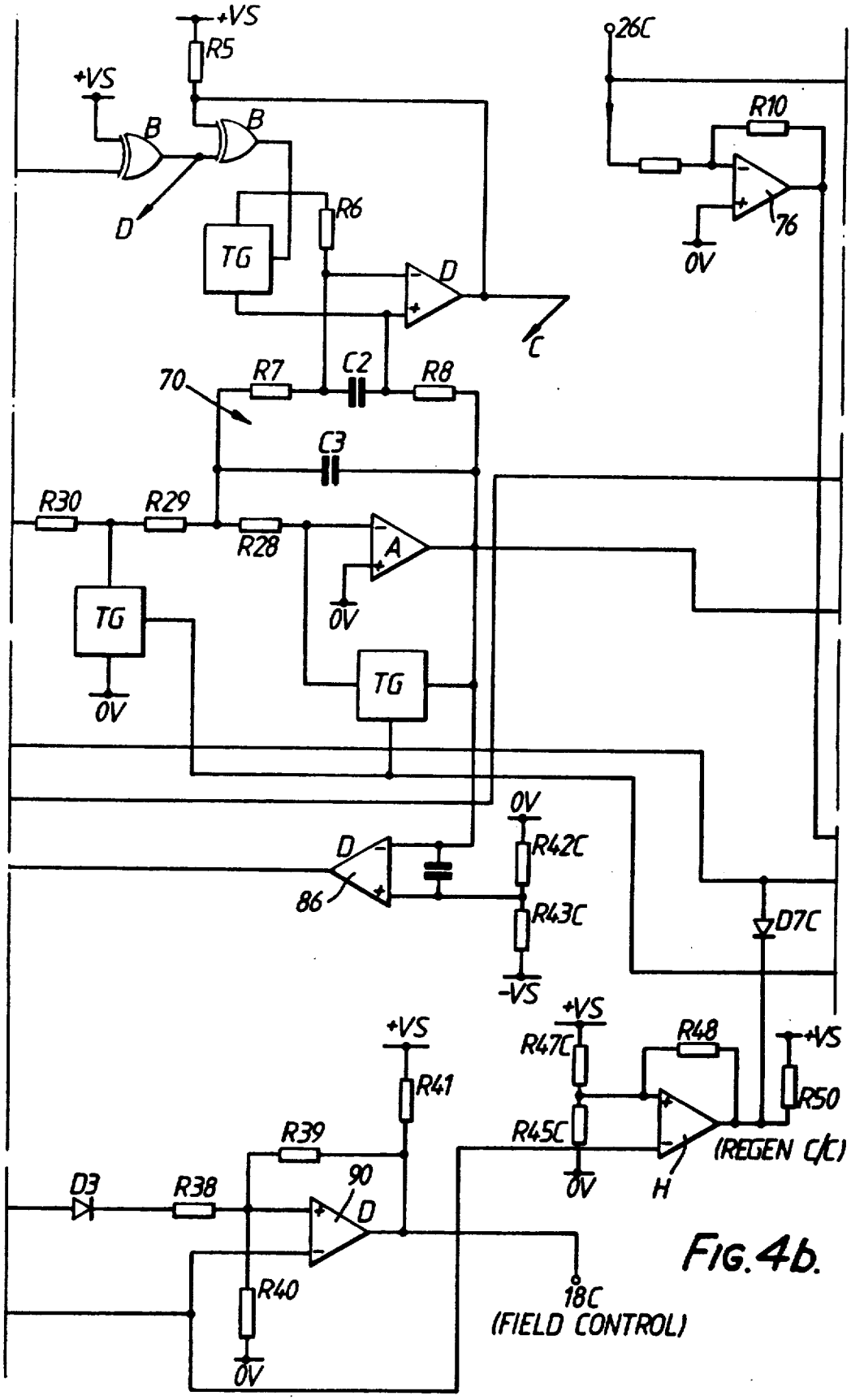
Figure 4C:
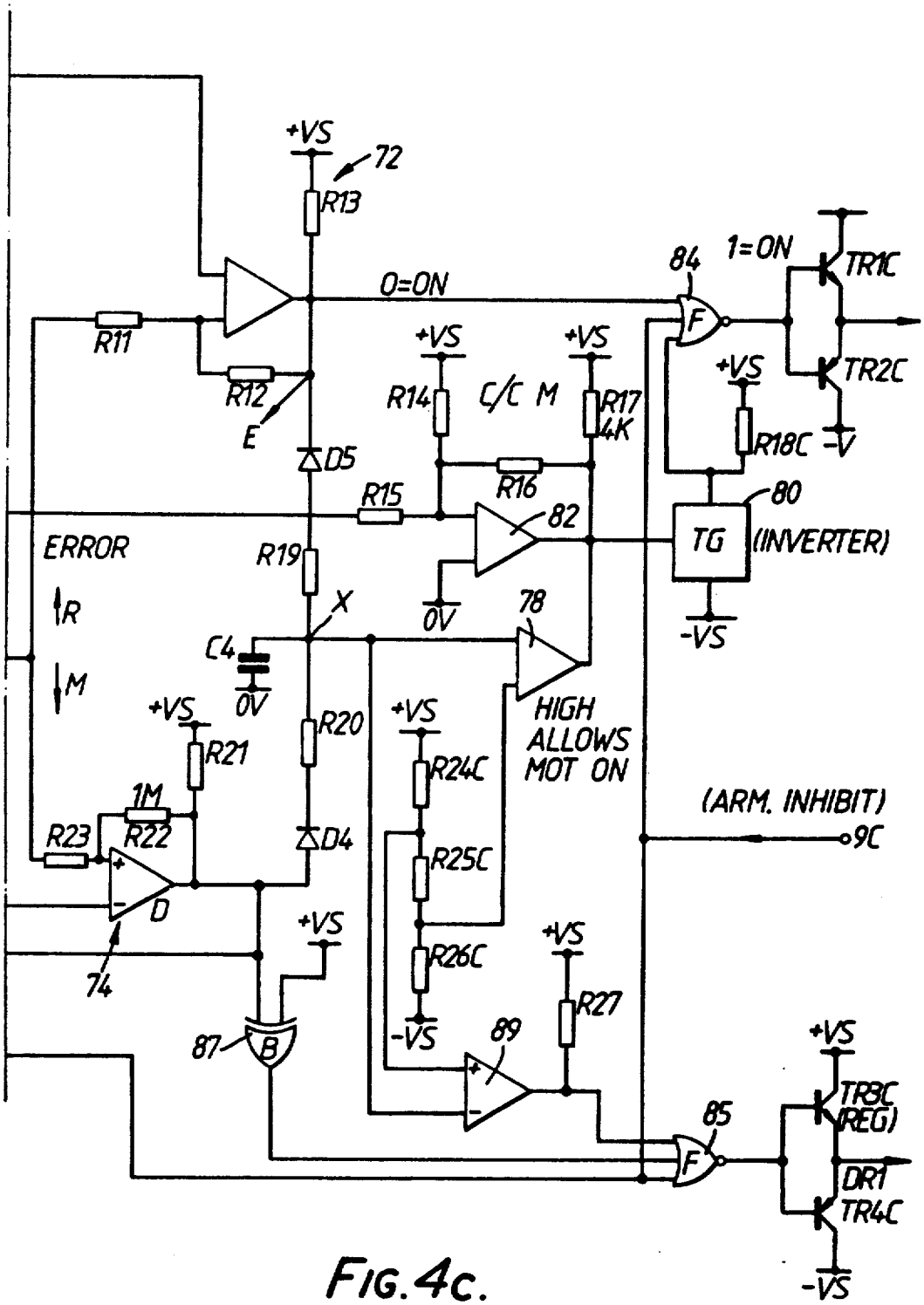

Referring to FIG. 4, the output of the demand conditioning circuit 25 is received by the armature control circuit 26 on a pin 20C. The pin 20C is connected to the non-inverting input of a unity gain buffer amplifier 66. The output of the buffer 66 is connected to the non-inverting input of a differential amplifier 68 which also receives "achieved" armature current signals at its inverting input from a pin 12C which is connected to the high voltage interface circuit 34. Thus, the output of the differential amplifier 68 is a signal proportional to the difference between the demanded and achieved armature current levels.

The output of the differential amplifier 68 is connected to the inverting input of an integrator 70. The output of the integrator 70 represents a frequency compensated error signal reflecting the difference between the demanded and achieved levels. A negative voltage error signal represents a net motor demand signal and a positive error signal represents a net braking demand signal.

Dealing first with a motor signal, the output of the integrator 70 is connected to the non-inverting input of a motoring chopper comparator 72 and a braking chopper comparator 74. Because the motoring error signal is at a negative potential relative to zero, the braking chopper comparator 74 is driven hard off and is rendered inoperative.

The inverting input to the motor chopper comparator 72 is supplied with a negative sawtooth waveform from a pin 26C connected to an output of the master sawtooth oscillator 33 (see FIG. 1). According to the magnitude of the motor error signal, the output of the motor chopper comparator 72 will thus be a variable mark/space ratio, (i.e. pulse width modulated), rectangular wave, proportional to the magnitude of the motor error voltage. The on-time of the rectangular wave is represented by a zero on the output of the motor chopper comparator 72. The output is connected through a logic three input NOR gate 84 to the drive circuit of the motor power transistor, which circuit comprises an emitter-follower connected pair of transistors TR1C and TR2C. The output of the NOR gate 84 is conditional upon two other inputs also being zero to actuate the power transit drive circuit. These will be described below.

Considering now a positive voltage braking error signal at the output of the integrator 70, the braking comparator 74 is supplied at its inverting input with a sawtooth output of the oscillator via an inverting unity gain amplifier 76. The motor chopping comparator is, of course, now rendered inoperative. Again, a rectangular wave control signal having a variable mark/space ratio is supplied to a three-input NOR gate 85 by way of a two input exclusive OR gate 87. The output of the NOR gate 85 is connected to an emitter-follow coupled pair of transistors TR3C and TR4C which drive the braking power transistor 16.

The output of the braking chopper comparator 74 is also connected to the output of an over-current trip comparator H. If the signal level at the error signal output of the differential amplifier 68 (which is connected to the inverting input of the trip comparator H) exceeds an allowable braking demand signal set by the voltage between biasing resistors R47C and R45C, connected between the positive rail and zero potential, the trip comparator H will apply a negative voltage to the input of the exclusive OR gate 87 through a diode D7C and inhibit the braking signal from reaching the NOR gate 85.

For the purposes of motor operation, the output of the integrator 70 is also connected to the inverting input of a d.c. detector 86. The detector 86 is also connected to the output of a resistive biasing network comprising resistors R42C and R43C connected in series between zero potential and the negative supply rail. When the error signal output of the integrator 70 is more negative than the bias level, i.e., the demand for speed is in excess of that capable of being supplied by controlling the armature current alone, the output of the detector 86 goes high and enables a latch circuit 88 which allows control of the electric motor speed by control of the field current. In this so-called d.c. operating condition the output of the latch 88 goes low and is compared, in a field control regenerative comparator 90, with the output of the differential amplifier 68. The output of the comparator 90 will be low in the event that the output from the differential amplifier 68 is in excess of the voltage on the non-inverting input. The consequently reduced field current will cause the armature current to increase in response. Thus, the difference between the demand and achieved signals will be reduced. This will cause the output of the differential amplifier 68 to decrease eventually to the point where the output of the comparator will 90 go high, turning the field current control back on.

When the output of the latch 88 goes low, it also transmits a signal through a diode D1C to the line connecting the output of the differential amplifier 68 to the input of the integrator 70. The applied voltage causes the output of the integrator 70 to shift out of the range of the sawtooth waveform in order to establish the controller well within the d.c. operating condition instead of on the edge of the successive peaks. In this way, the minimum d.c. operating level is shifted far enough from the sawtooth waveform to render the d.c. operation immune to spurious noise signals which might otherwise make the controller fluctuate between chop and d.c. operation.

Operation of either the motor or braking power transistor 14 or 16 is conditional upon certain inputs to the corresponding three-input NOR gate 84 or 85. Firstly, an armature inhibit signal is received from the trip and start circuit on a pin 9C and is applied to both NOR gates 84 and 85. Additionally, the armature inhibit signal is applied to the input of a transmission gate Ta. On receipt of a high armature inhibit signal the transmission gate Ta shorts the inverting input of the integrator 70 to zero potential thus preventing any error signal from the output of the differential amplifier 68 being applied to the chopper circuits 72 and 74.

A transmission gate inverter 80 is connected, at one end to one of the inputs of the NOR gate 84 and at the other end, through a resistor R18C to the positive supply rail. The inverter 80 is actuated by the output of a first lockout comparator 82. The output of the differential amplifier 68 is connected to the non-inverting input of the first lockout comparator 82 and the inverting input is connected to zero potential. When the inverter 80 is actuated, the input to the NOR gate 84 is connected to the negative rail potential.

A node X between the outputs of the chopper comparators 72 and 74 is at zero potential when equal signals are produced at the outputs. The node X is connected to the inverting input of a second lockout comparator 78. The non-inverting input is connected between resistors R25C and R26C which apply a negative bias voltage. The resistors R25C and R26C are part of a resistive biasing network comprising the resistors R25C, R26C and a resistor R24C, which are connected in series between the positive and negative supply rails. If the voltage at the node X is sufficiently more negative than the bias voltage at the non-inverting input of the comparator 78, a high signal is produced at the output thereof which produces the required low signal at the transmission gate inverter 80 to allow the chopper rectangular wave signal to be applied to the emitter-follower transitor drive circuit comprising transistors TR1C and TR2C, thereby actuating the motor drive power transistor 14 (FIG. 1).

The voltage at the node X is also applied to the inverting input of a third lockout comparator 89. The non-inverting input is connected between the resistors R24C and R25C and receives a positive biasing voltage which must be overcome by a sufficiently positive braking error chopper control signal from the node X to cause a low input to the NOR gate 85. When the armature inhibit signal and the output of the exclusive OR gate 87 are also low, the regenerative braking emitter-follower drive circuit comprising transistors TR3C and TR4C is actuated, thereby actuating the braking transistor 16 (FIG. 1).

The reference signal applied to the comparator 78 is lower than that applied to the comparator 89. Since the motor drive transistor 14 is actuated only if the voltage at X is more negative than the lower voltage level on the non-inverting input of the comparator 78 and the braking-transistor 16 is actuated only if the voltage at X is more positive than the higher voltage level on the non-inverting input of the comparator 89, both transistors cannot be actuated at once.

Figure 5A:
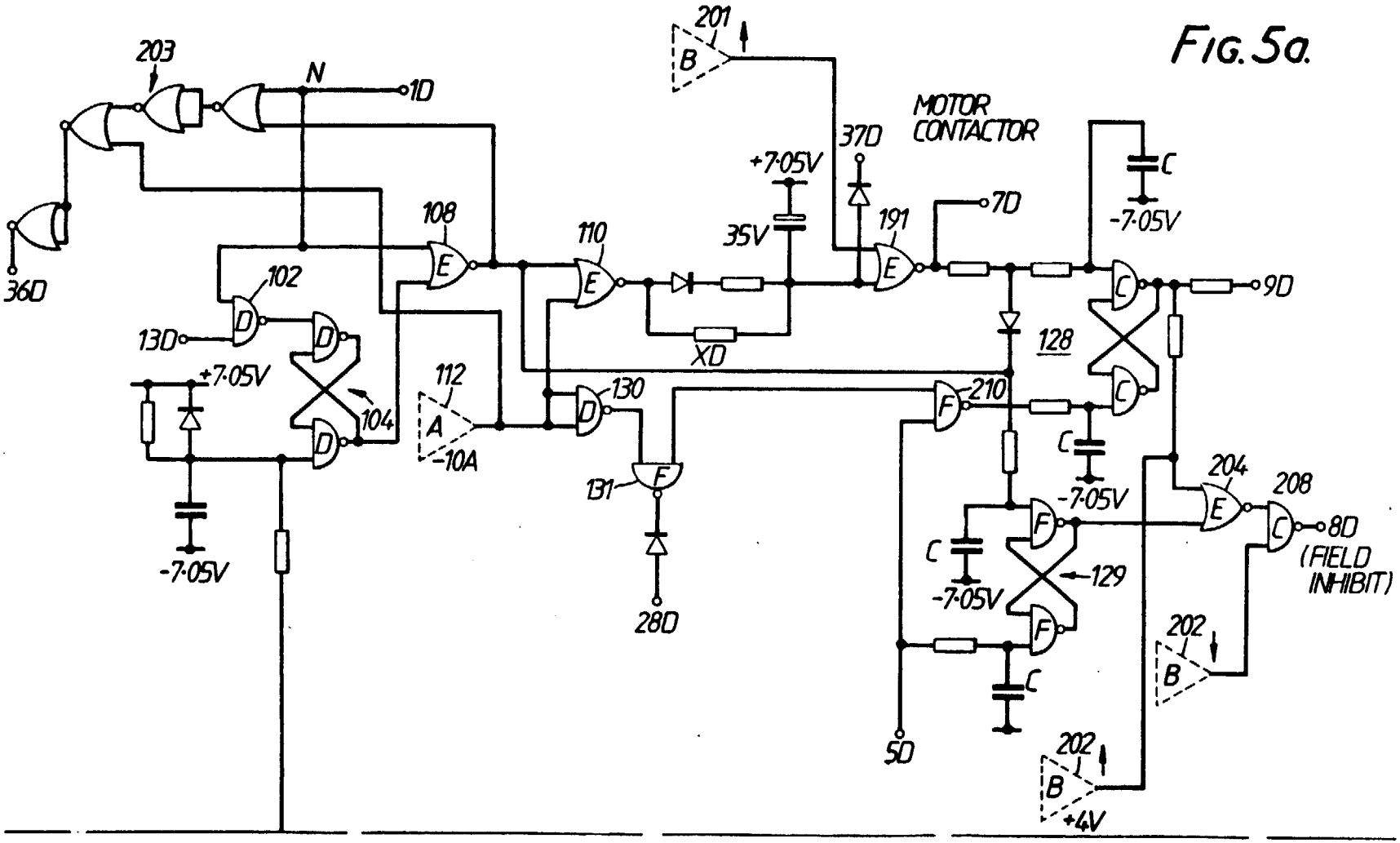
FIGS. 5a, 5b is a circuit diagram of a trip and start circuit incorporated in the circuit of FIG. 1.
Figure 5B:
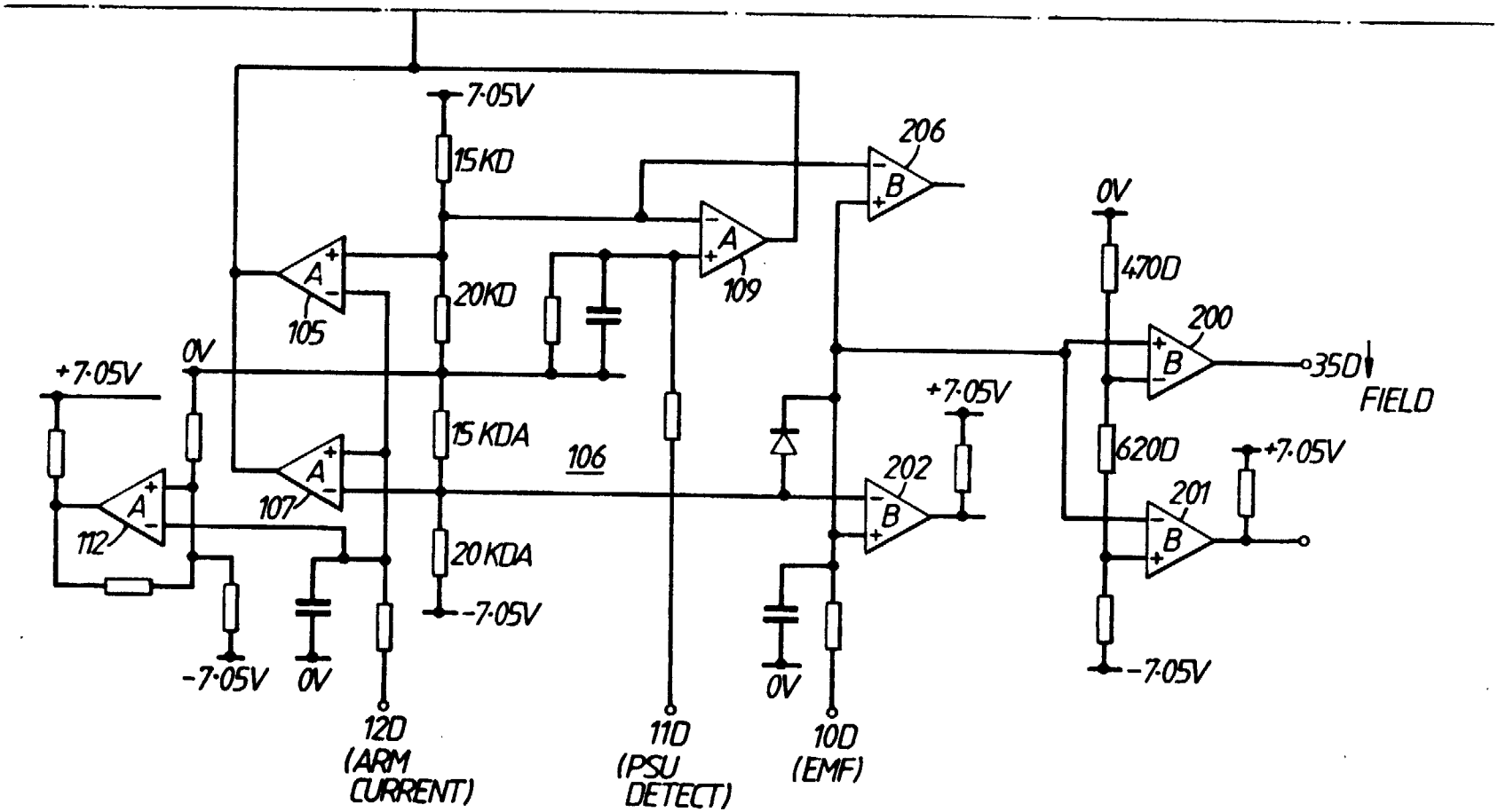

As mentioned above, the running of the electric machine in motor or braking mode is conditional on the state of the battery and the machine. These conditions are set and monitored by the trip and start circuit 32 which is shown in more detail in FIG. 5.

Firstly, the trip and start circuit 32 will actuate the isolating contactors 19 on start-up in response to a high neutral signal received at a pin 1D. The neutral signal is applied to one input of a second two- input NAND gate 102. A high signal, received at a pin 13C, is connected to the other input and signifies that the leakage current through the power transistors 14 and 16 (see FIG. 1) is within acceptable limits as the potential between them at point A (FIG. 1) is approximately between 40% and 60% of the battery voltage. This indicates that the transistors are healthy. A high signal from the pin 13D produces a low output of the NAND gate 102 which is applied to one input of a latch 104. The other input to the latch 104 is connected to a condition response circuit 106.

The condition response circuit 106 consists of a number of comparator circuits which impose conditions on the trip and start up circuit such that if any one of these conditions is not satisfied the main motor contactor is pulled out of or prevented from being put into the circuit connecting the armature to the battery.

Firstly, a signal representative of the armature current is received on a pin 12D. The pin 12D is connected to the inverting input of a comparator 105. A fixed voltage derived from between serially connected resistors 15KD and 20KD connected between the positive and zero rails and representing a maximum motor armature current of 400 amps is applied to the non-inverting input of the comparator 105. If the armature current exceeds the maximum 400 amps, a low trip or start preventing signal is generated at the output of the comparator 105 and applied to the other input of the latch 104 through a resistor 2K2D.

Similarly, if the armature current exceeds a magnitude of −300 amps in the regenerative mode the motor will be inhibited by the control circuit. This is achieved by the signal on the pin 12D also being applied to the non-inverting input of a comparator 107, which is also supplied with a fixed voltage at its inverting input representing the −300 amps by a voltage derived from between serially connected resistors 15KDA and 20KDA connected between the zero and negative rails. If an excessive armature current occurs in the regenerative mode it is desirable to maintain the main motor contactor in circuit to prevent it being damaged if such is safely possible. Thus to protect the motor itself in this case, both the field and armature currents are clamped to zero and the motor contactor 21 is maintained in circuit. To do this, the presence of a regenerative current is detected by a comparator 112 which is connected to the pin 12D by its inverting input to signify the presence of a regenerative, i.e. negative, current flowing in the armature. The output of the comparator 112 is high when a signal representing a regenerative current of more than a nominal 10 amps is applied from the pin 12D. The output of comparator 112 is applied to one input of a two input NOR gate of a group of NOR gates 203 which output over rides the inputs from the pin 1D and the output of the NOR gate 108 to an initial NOR gate of the group of NOR gates 203. This results in a high output on a pin 36D which maintains the isolating contactors 19 in circuit. The comparator level of 10 amps is chosen to introduce a level of noise immunity in detecting the regeneratuve current to avoid a situation in which the trip and start circuit will trip the motor out in the braking mode in the presence of low noise levels.

The motor will also fail to operate or be tripped if the power supply voltage is not adequate to power the circuitry. To monitor this the power supply voltage is applied, through a pin 11D, to the non-inverting input of a comparator 109 which input is compared with a set level taken from the serially connected network comprising the resistors 15KD and 20KD connected between the positive rail and zero potential representing the desired healthy voltage.

The condition response circuit 106 also monitors for the presence of a back EMF across the armature. In the event of rapid roll back (i.e. when the vehicle is being driven forward but actually moving rapidly backward or being driven in reverse but actually moving rapidly forward) there will appear a negative voltage on a pin 10D as a result of monitoring the armature voltage in the HV interface circuit 34 (to be described later with reference to FIG. 7). This negative back EMF is applied to the non-inverting input of a comparator 200. The inverting input of the comparator 200 is supplied with a voltage equivalent to a back EMF of −0.5 volts derived from between a pair of serially connected resistors 470D and 620D which are part of a series resistance network comprising those resistors and a resistor 5K6D serially connected between zero and the negative rail. If this back EMF is more negative than −0.5 volt a first protection safeguard is actuated by a low output on a pin 35D which increases the field current which will effectively increase the armature current in order to arrest the movement of the vehicle in the opposite direction to the selected mode.

If the increasing field current fails to reduce the back EMF and it reaches a value more negative than −1.15 volts, the input on the pin 10D, which is also supplied to the inverting input of a further comparator 201, actuates a second protection safeguard which results in the main motor contactor 21 being taken out of circuit. The back EMF of −1.15 volts could cause damage to the diode 17 (see FIG. 1) which can only be avoided by opening the contactor 21.

In some circumstances (for instance if the user of the vehicle inadvertently selects one mode of operation while the vehicle is moving in the other) the back EMF may approach −3 volts. In order to limit the maximum back EMF the pin 10D is also connected to the non-inverting input of another comparator 202 which has a bias voltage derived from between resistors 15KD1 and 20KD1 equivalent to −3 volts applied to its inverting input. When the back EMF is more negative −3 volts the output of the comparator 202 goes low initiating a limiting signal which switches the field excitation voltage by switching it on and off, effectively to limit the overall maximum negative value of −3 volts.

Assuming the signal applied to either of the pins 11D and 12D satisfy the requirements for continued operation without tripping, the motor is also in a condition to be started. An initially high signal is received on the pin 1D signifying that the drive selection is in the neutral position and a high signal is received on a pin 13D signifying that the potential at the point A (see FIG. 1) is between 40% and 60% of the battery voltage. If the voltage of point A was outside approximately 40 to 60% of the battery voltage, one or the other of the transistors would be faulty or some other fault existed in the circuit between the battery terminals and it would be unsafe to start.

The two high signals from the pins 1D and 13D produce a low signal at the output of a two input NAND gate 102. The consequently low output of the NAND gate 102 is applied to an input of the latch 104. The remaining input is, as already stated, high by virtue of the condition response circuit and a capacitor connected between the input to the latch 104 and the negative rail is thus charged. This produces a low input to one input of a two input NOR gate 108 which also receives a low signal on its other input when the high neutral signal is removed. Consequently, the output of the NOR gate 108 goes high when forward or reverse is selected from neutral. At start up, the armature regenerative current will not be above the 10 amps required to achieve an output from the comparator 112. Thus, initially, a low signal is applied by the comparator 112 to one input of a further two input NOR gate 110 and the high output of the NOR gate 108 is applied to the other input, creating a low output therefrom.

During the time before the motor was initiated for starting, a capacitor 4u7D connected between the positive rail and one input of a two input NOR gate 111, to which the output of NOR gate 110 is eventually connected, is charged to a relatively high potential.

Thus, initially the low signal output from the NOR gate 110 does not influence the input to the NOR gate 111 owing to the relatively long discharge time constant of the capacitor 4u7D through a high value resistor XD. The other input to the NOR gate 111 is supplied from the output of the comparator 201. Due to the time constant to the output of the capacitor the armature inhibit signal remains and no armature current is supplied.

The high output of the NOR gate 108, however, is also applied to one input of a field latch 129. The other input to the latch 129 is supplied from a pin 5D which signifies an open main motor contactor by a low signal. The output of the field latch 129 is reset to a low signal. This field latch output is applied to a two input NOR gate 204 which also receives a signal from a comparator 206 which indicates by a low signal that the armature voltage is below +4 volts so that a high output therefrom is received by a NAND gate 208 which also has the output of the comparator 202 applied to it. When the back EMF is below the damaging minus three volts, i.e. at start up from stationary, a field inhibit signal is lifted and excitation current flows in the field circuit. Once excitation current has exceeded 3 amps a signal is received from the field control circuit 28 on a pin 37D which drags the input to the NOR gate 111 low. At this point, the output of the NOR gate 111 will go high and produce a corresponding high on the pin 7D which will bring in the main motor contactor 21. The high signal is also applied to an input of an armature latch 128. The other input to the armature latch 128 is supplied from a combination of the high input on the pin 5D, now signifying that the main motor contactor 21 is closed and the high input on a pin 6D, signifying that an acceleration demand signal has not been applied.

Both inputs are applied to respective inputs of a two input NAND gate 210 which produces the low input to the latch 128. The low output of the NAND gate 210 thus removes the high armature inhibit signal on a pin 9D preventing currents flowing in the armature. In this condition the motor will start to turn and continue to do so under the influence of the demand circuit unless one of the conditions required to prevent trip fails to be met.

When a braking demand is applied, the vehicle will eventually come to a halt, placing the electric motor in a no load condition. It is wasteful to continue to supply the separately excited field winding with a current, typically around 20 amps. By making a judgement on the presence of a braking mode signal on the pin 6D and detecting substantially no armature current signal on the pin 12D, a low output is produced from the comparator 112. This latter is inverted by a two-input NAND gate 130. The two signals from the pin 6D and the output of the NAND gate 130 are applied to the inputs of a further two input NAND gate 131 which produces a low signal which is then transmitted to the field control circuit through a pin 28D which causes the field current to be reduced to 3 amps until such time as a load is again placed upon the machine and a current again appears in the armature.

Figure 6A:
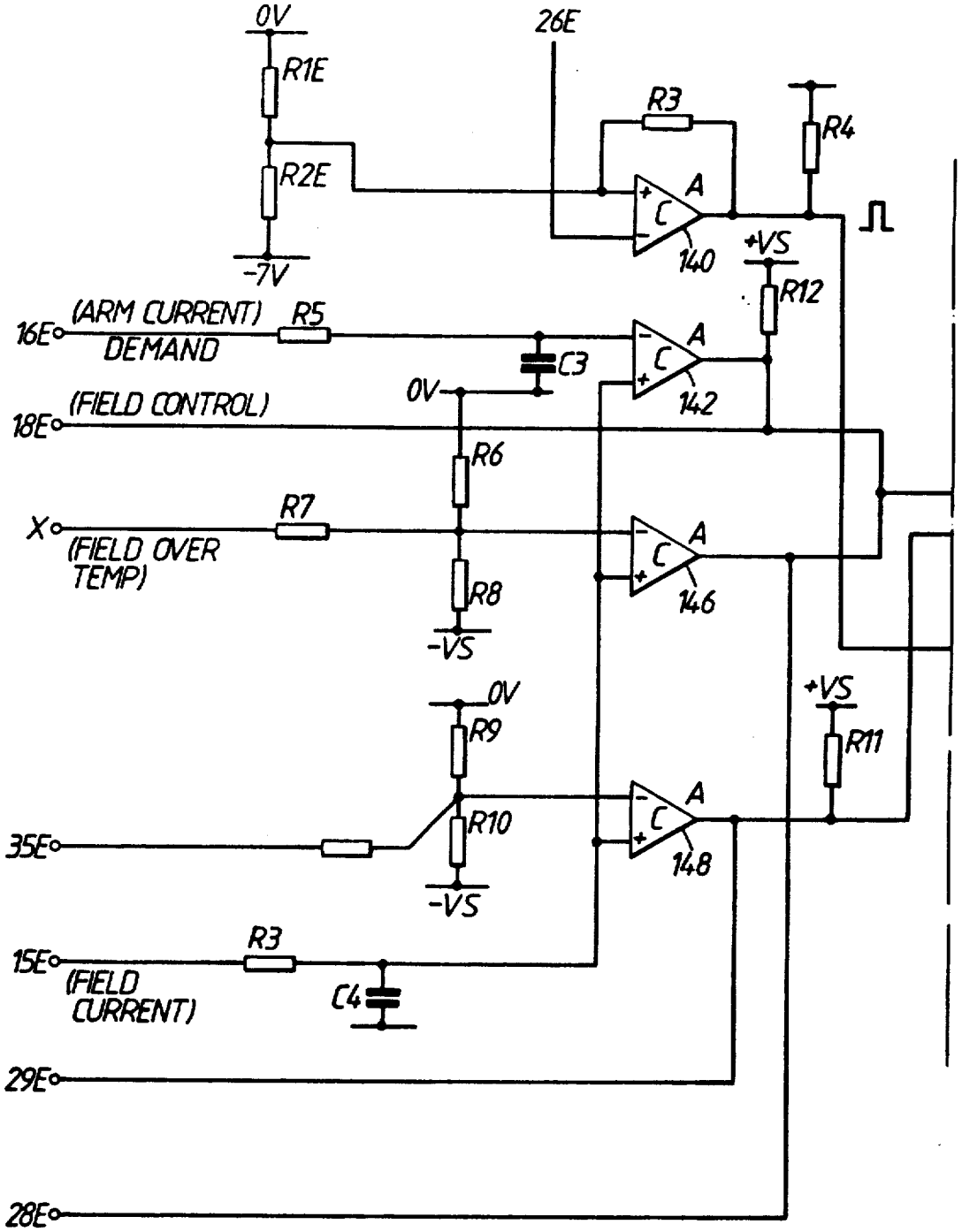
FIG. 6a, 6b is a circuit diagram of a field control circuit incorporated in the circuit of FIG. 1.
Figure 6B:
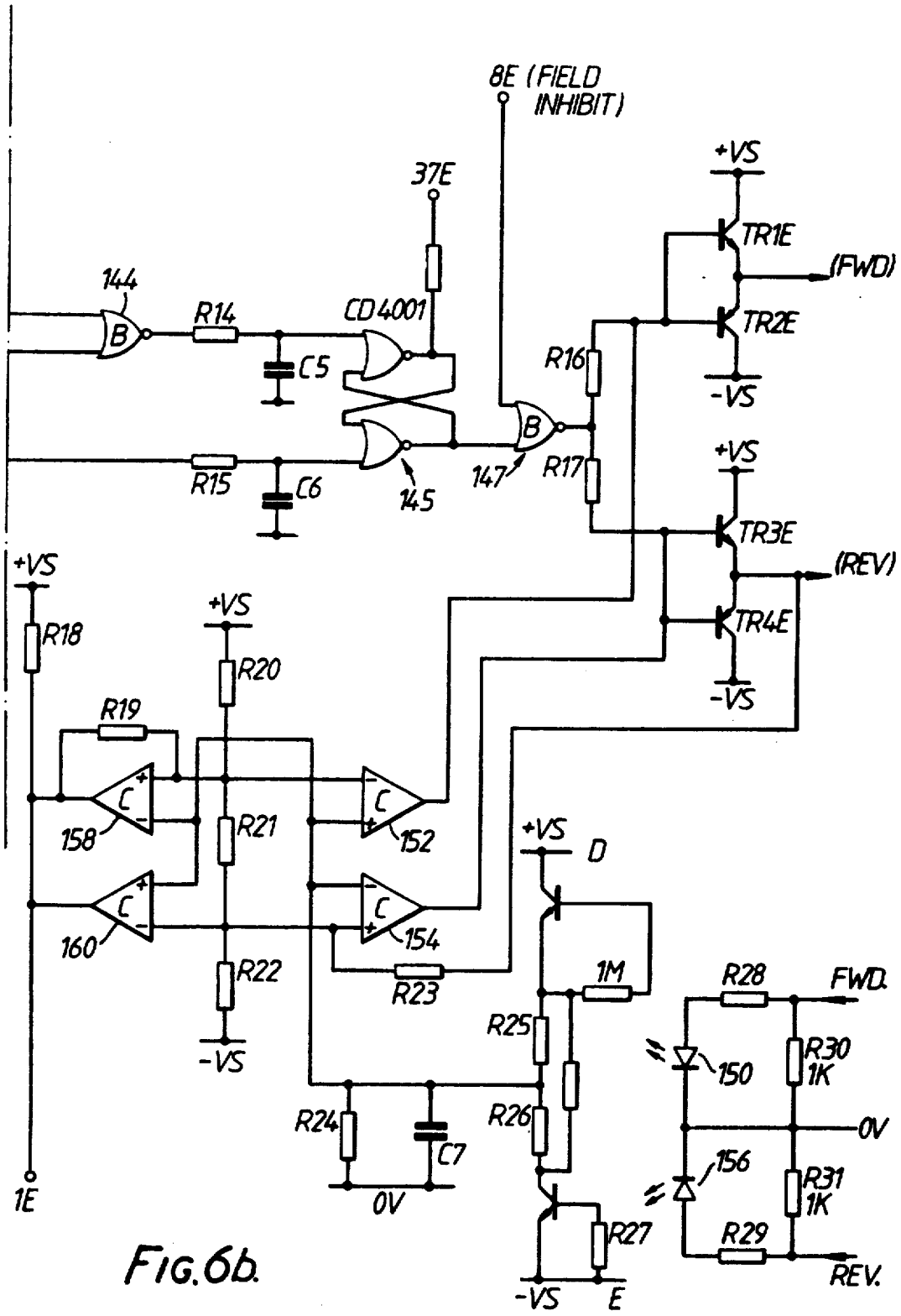

The field control circuit is illustrated in more detail in FIG. 6.

The sawtooth waveform from the oscillator is received on a pin 26E and applied to the inverting input of a regenerative comparator 140. The non-inverting input receives a negative bias voltage from a series resistor network comprising resistors R1E and R2E coupled in series between the zero potential and the negative supply rail. The output of the comparator 140 will be subject to hysteresis such that it goes high once every cycle of the sawtooth waveform to produce a pulse which is used to actuate the field control transistors on a synchronised cycle-by-cycle basis.

An analogue representation of the armature current is received on a pin 16E which is connected to the inverting input of a comparator 142. The non-inverting input of comparator 142 receives a signal from a pin 15E which is representative of the field current level. It is desirable that the relative proportion of the armature current to the field current be kept substantially constant, thus the armature current signal on the pin 16E is compared with the field current signal on the pin 15E in the comparator 142. If the signal representing the field current exceeds that representing the armature current, the output of the comparator 142 goes low. As a result of this, a two input NOR gate 144 which receives the output from the comparator 142 goes high. The cycle-by-cycle pulse output of the comparator 140 resets a latch 145. The other input to this latch is derived from the output of the NOR gate 144. The output of the latch 145 is coupled to a further two input NOR gate 147. The output of this NOR gate, which is operably connected to a pair of emitter-follower field transistor drive circuits, is accordingly held low. As the field current drops the pulse output of the comparator 140 will force the latch back and the correct relative field/armature current proportions will be resumed.

It is also a condition, in this particular embodiment, that the field current does not exceed 20 amps nor drop below 3 amps. In the former case, damage to the field winding could result and in the latter, the machine could become unstable or result in the machine exceeding its commutation circuit limit. To avoid this the input on the pin 15E is compared to preset bias values relating to the two current limits.

Firstly, the pin 15E is connected to the non-inverting input of a comparator 146 and compared to a bias voltage simulating 20 amps on the inverting input. In the event of a field current in excess of 20 amps the output of the comparator, also connected to the input at the NOR gate 144, goes low, causing the field current control to be inhibited.

Secondly, the pin 15E is connected to the non-inverting input of a comparator 148 and the signal is compared to a simulated field current of 3 amps by a bias voltage on the inverting input created between resistors R9E and R10E serially connected between zero potential and the negative supply rail. If the field current falls below 3 amps, the output of the comparator 148 will go high and maintain the output to the field transistors.

If the trip and start circuit detects that the vehicle is motionless and it is appropriate to reduce the field current to 3 amps, as previously described, a low signal is received by the field control circuit on a pin 28E which is connected to the output of the comparator 146 and one input of the NOR gate 144 is held low.

The field transistor drivers are split into emitter-follower pairs. The first pair comprising transistors TR1E and TR2E are connected to control the electric motor to move in a forward direction and the second pair comprising transistors TR3E and TR4E are connected to control the electric motor to move in a reverse direction.

"Forward" signals are received as a positive voltage which actuates a first opto-isolator 150. The output of the opto-isolator consists of a positive voltage which is applied to the non-inverting input of a comparator 152 and the inverting input of a comparator 154. The positive voltage is compared to a reference voltage derived from the series potential divider network comprising resistors R20E, R21E, and R22E connected between the positive and negative supply rails. This produces a positive output from the series potential divider network which enables the first emitter-follower pair and a negative output from the second comparator which drives the second emitter-follower pair hard off.

If a 'reverse' voltage is received by a second opto-isolator 156 it conducts and produces a negative voltage at the first and second comparators 152 and 154. Consequently the first emitter-follower pair is driven hard off and the second emitter-follower pair enabled to control the reverse field transistors.

When neither forward or reverse is selected the neutral high signal is produced through comparators 158 and 160 which compare the outputs of the opto-isolators connected to inverting and non-inverting inputs respectively to a positive and negative voltage on the positive and negative outputs respectively. Thus, the output of each comparator will be high with no signal from the opto-isolators 150 and 156. The output is connected to a pin 1E which is connected to the trip and start circuit 32.

Figure 7:
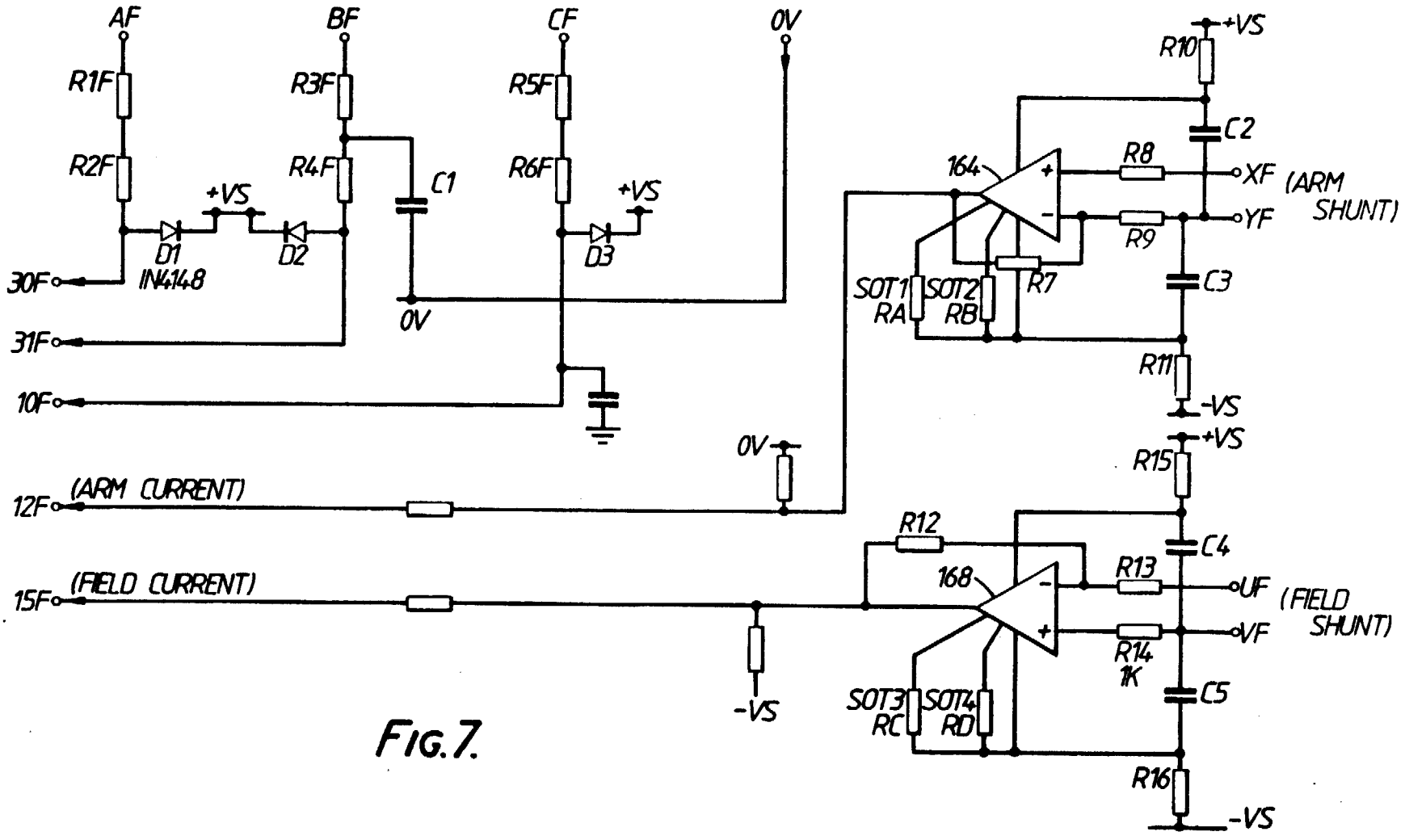
FIG. 7 is a circuit diagram of a high voltage interface circuit incorporated in the circuit of FIG. 1.

The high voltage interface circuit 34 is shown in more detail in FIG. 7. A first resistor 162 in the armature circuit (see FIG. 1) is connected across terminals XF and YF of the high voltage interface circuit 34. The terminals XF and YF are connected to non-inverting and inverting terminals respectively of a differential amplifier 164 which responds with an output on a pin 12F proportional to the voltage drop across the resistor 162 (see FIG. 1) which is related to the current in the armature winding 11.

Similarly a second resistor 166 (see FIG. 1) is connected in the path supplying the field winding 12 and is connected across terminals UF and VF of the high voltage interface circuit. The terminals UF and VF are connected to the inverting and non-inverting inputs respectively of a second differential amplifier 168 to produce an output on a pin 15F proportional to the field current.

As mentioned above, the point A between the motor and braking power transistors 14 and 16 is monitored in order to assess the health of the power transistors. The point A is connected to a pin AF on the high voltage terminal interface 34. The excessive voltage is dropped by a pair of series connected resistors R1F and R2F before an output pin 30F.

The battery voltage is monitored by a connection between the positive battery line and a pin BF. The voltage at BF is dropped by resistors R3F and R4F and applied to an output pin 31F.

Similarly the armature voltage is monitored by a connection between the positive side of the armature winding and a pin CF. Again, the voltage at CF is dropped by two series connected resistors R5F and R6F and applied to an output pin 10F.

Each of the output pins 30F, 31F and 10F are clamped to the positive supply rail through diodes D1F, D2F and D3F respectively. Thus, in the event that the voltages at the output pins 30F, 31F and 10F are greater than the supply voltage, they are clamped to the supply voltage level.

Figure 8:
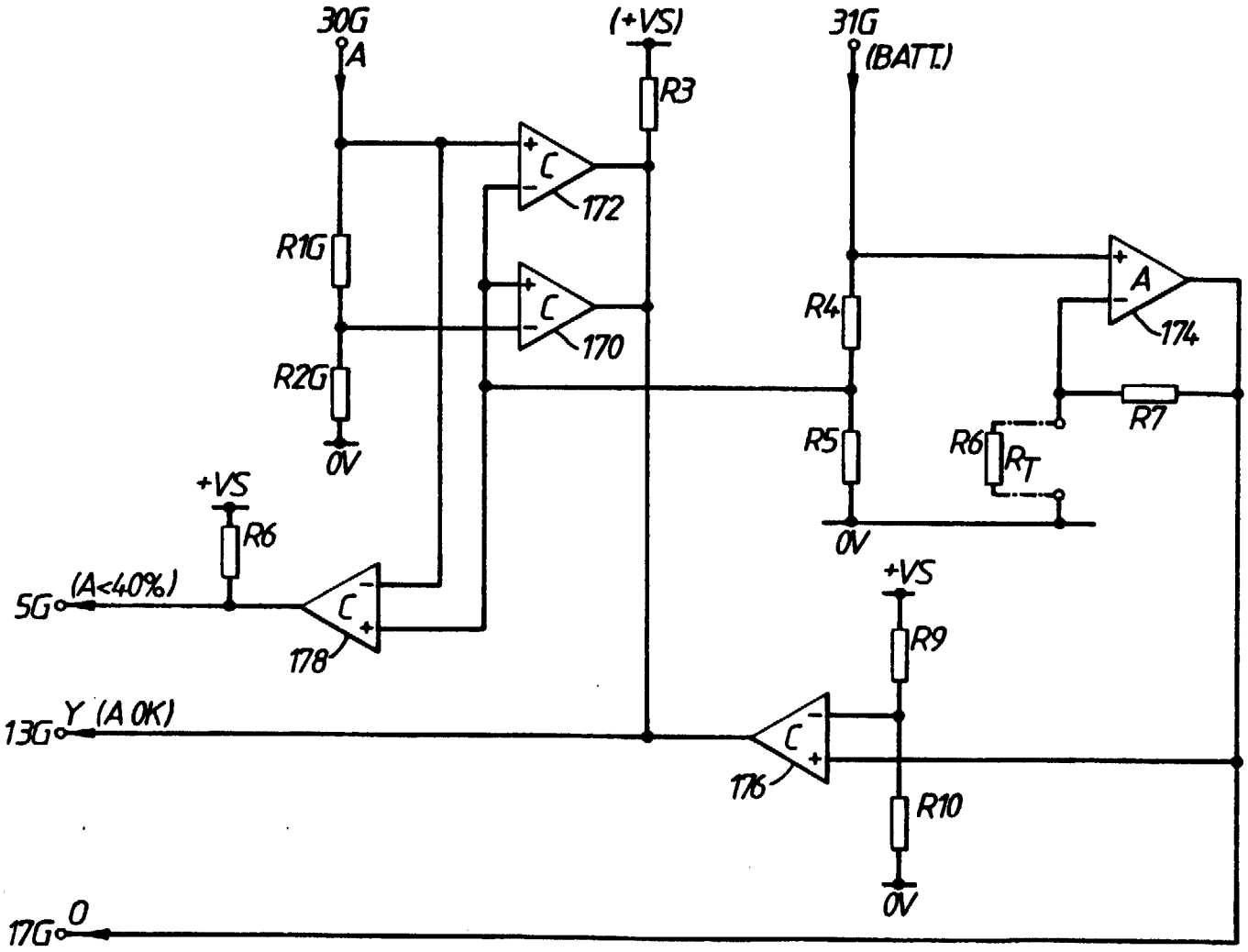
FIG. 8 is a circuit diagram of a proving and high voltage buffer circuit incorporated in the circuit of FIG. 1.

The proving and high voltage buffer 36 is used to assess the circuit condition at start-up and is illustrated in more detail in FIG. 8. Inputs on pins 30G and 31G from the high voltage interface 34 relate to the voltage at the reference point A and the battery voltage respectively. The signal related to the battery level on the pin 31G is applied to the non-inverting and inverting inputs of a pair of comparators 170 and 172 respectively. The remaining non-inverting input of the comparator 172 is connected to the pin 30G and the inverting input of the comparator 170 is connected between resistors R1G and R2G which are connected between the pin 30G and the zero potential. Thus a proportion of the battery voltage is compared with the voltage at the reference point A in the comparator 172 and with a proportion of the voltage at the reference point A in the comparator 170. When each comparator achieves a high on its output, a signal is emitted through a pin 13G signifying that the voltage at the point A is between, for example, 40% and 60% of the battery voltage.

In the case of a very low battery voltage an amplifier 174 connected at its input will transmit an output low level to the non-inverting input of a comparator 176, which has a bias voltage applied to its inverting input, to produce a low output therefrom to the pin 13G that will inhibit the start of the motor.

The input to the non-inverting input of the comparator 170, the inverting input of the comparator 172, and the input to the non-inverting input of the comparator 172, are respectively also connected to the non-inverting and inverting inputs of a comparator 178 which will produce a high out signal on a pin 5G in the event that the voltage at reference point A is less than approximately 40% of the battery voltage.

A further output on a pin 17G is connected directly to the output of the amplifier 174 and will produce a signal related to the battery voltage.

Figure 9:
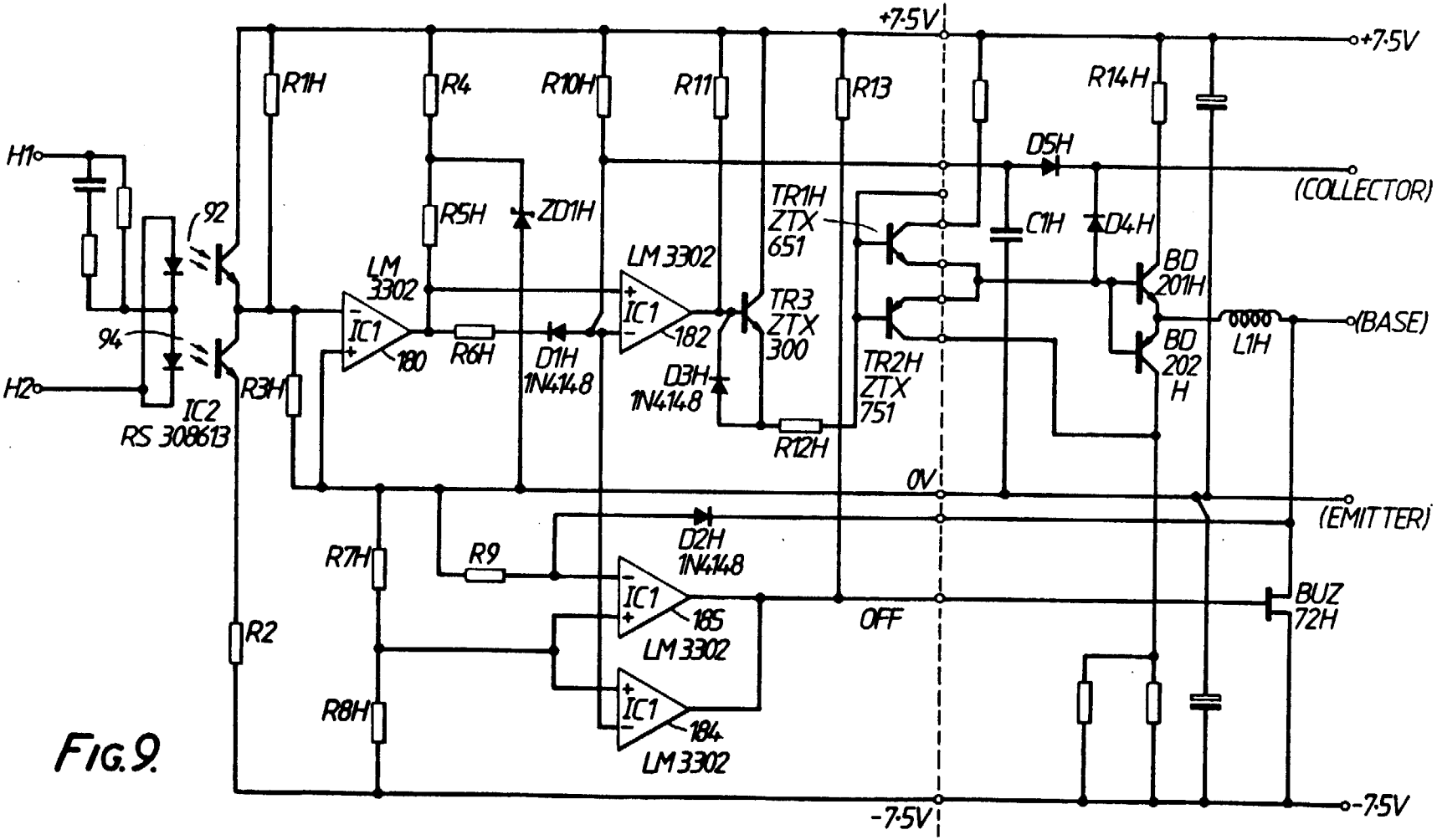
FIG. 9 is a circuit diagram of a motor drive circuit incorporated in the circuit of FIG. 1.

The motoring output of the armature control circuit on the pin 25C is connected to a motor drive circuit which is illustrated schematically in FIG. 9 of the drawings.

Dealing firstly with the situation in which the motor power transistor 14 is maintained off, an input to the motor drive circuit is received on a pin H1 which is low relative to a pin H2 and maintains an opto-isolator 92 in an on state and an opto-isolator 94 in an off state. In this condition the inverting input of an amplifier 180 is connected with the positive supply rail potential. The non-inverting input of the amplifier 180 is connected to zero volts. The output of the amplifier 180 will thus be forced into negative saturation through a serially connected chain comprising a resistor R6H, a diode D1H and a further resistor R10H providing the path in the positive supply rail.

A capacitor C1H is connected between the junction of the anode of the diode D1H and the resistor R10H and the zero volt rail. The junction is also connected to the inverting input of a comparator 182. As the output of the amplifier 180 is in negative saturation, the voltage at the anode of the diode D1H is negative with respect to zero but above the output of the amplifier 180. The non-inverting input to the comparator 182 is connected to the output of the amplifier 180. As a result, the non-inverting input of the comparator 182 is more negative than the inverting input, thus the output of the comparator 182 is negative. A path through a diode D3H and a resistor R12H connects the output of the comparator 182 to the base of a PNP transistor TR2H which is held on, and from the emitter of the transistor TR2H to the base of a further PNP transistor BD202H, which is also held on. The emitter of the PNP transistor BD202H is connected through a flywheel choke L1H to the base of the motor power transistor 14 and through the transistor BD202H to the negative rail. The base of the motor power transistor 14 is thus held off by the negative voltage applied through the choke L1H.

The non-inverting input of a comparator 184 is held normally low by virtue of its connection between resistors R7H and R8H which are serially connected between zero potential and the negative supply rail. This input to the non-inverting input acts as a reference level which must be overcome by the output of the comparator 180 when the motor power transistor is to be turned on. With low voltage on the inverting input of the comparator 184 the output is normally high which holds on a FET transistor BUZ72H. The drain of the FET transistor BUZ72H is connected to the base of the motor power transistor 14 and the source is connected to the negative supply rail, thus the input to the base of the motor power transistor 14 is held well off substantially at negative supply rail potential.

When it is required to turn the motor power transistor 14 on in either chop or d.c. operation, a high signal on the pin H1 relative to the pin H2 actuates the opto-isolator 94 and turns off the opto-isolator 92. In response to this, the inverting input to the comparator 180 will be forced more negative with respect to zero potential as it is now only connected to the positive supply rail through a resistor R1H. The non-inverting input to the comparator 180 is directly connected to the zero volt rail.

Just after the transition described above the inverting input of the comparator 182 is held momentarily negative by the charge stored in the capacitor C1H. This means that just after transition the non-inverting input of the comparator 182 is more positive than the inverting input, so the output thereof changes to a high which is applied to the base of a NPN transistor TR3H. The collector of the transistor TR3H is connected to the positive supply rail and the emitter is connected to the junction between the diode D3H and the resistor R12H.

The high on the base of the transistor TR3H puts it in a conducting state which applies a high to the base of an NPN transistor TR1H. The collector of the transistor TR1H is connected to the positive supply rail and the emitter is connected to the emitter of the transistor TR2H. The high on the base of the transistor TR1H turns the transistor on which applies a high to the base of a further transistor BD201H connected in a complimentary arrangement with the transistor BD202H which is turned off.

At this point substantially all the supply rail voltage is applied to the left hand side of the flywheel choke L1H through a resistor R14H and transistor BD201H. However, the right hand side of the choke L1H is still connected to the negative rail potential through the FET transistor BUZ72H.

The FET transistor BUZ72H is held on by the low potential across the capacitor C1H which is connected to the inverting input of the comparator 184 as well as the input of the comparator 182 and the output of the comparator 180 through the diode D1H and the resistor R6H.

As the capacitor C1H charges towards the positive rail potential, the signal at the inverting input of the comparator 184 rises. When the potential on the capacitor C1H passes the reference level applied to the non-inverting input of the comparator 184, the comparator output goes low. Consequently the drive to the gate of the FET transistor BUZ72H is removed and it is rendered non-conducting. Therefore, instead of passing to the negative rail via the FET, the current through the choke is instead directed to the base of the motor power transistor 14 in the form of a definite impulse waveform. The impulse nature of the current to the base provides an unambiguous spike control signal with which to switch on the motor power transistor 14.

At this point in switching on the motor drive transistor 14, the potential at the collector is reduced as the current flowing to the base causes the power transistor to conduct. However, a diode D4H connected between the collector ouput pin and the base of the transistor BD201H holds the potential of the transistor BD201H out of saturation.

A further diode D5H is connected between the inverting input of the comparator 182 and the collector output pin. The non-inverting input of the comparator 182 has a zener diode ZD1H connected to it through the resistor R5H. If the current in the collector becomes too large and causes the non-inverting input of the comparator 182 to be lower than that at the inverting input, the output of the comparator 182 will go low and switch off the motor power transistor 14.

When it is required to turn the motor power transistor 14 off, the opto-isolator 92 is actuated by a low signal on the pin H1 with respect to H2 and the opto-isolator 94 is turned off. As a result the transistor BD202H is turned on which removes the current from the flywheel choke L1H. At this, the motor power transistor 14 switches off, causing the potential at the collector to rise. At this point, the diode D5H becomes reverse biased. The potential across the capacitor C1H decays to a magnitude less than that of the reference level set by the resistors R7H and R8H. When the potential at the inverting input to a comparator 185 falls below the reference voltage set by the resistors R7H and R8H the FET transistor is turned back on to sink the right hand side of the flywheel choke L1H to negative rail potential.

Figure 10:
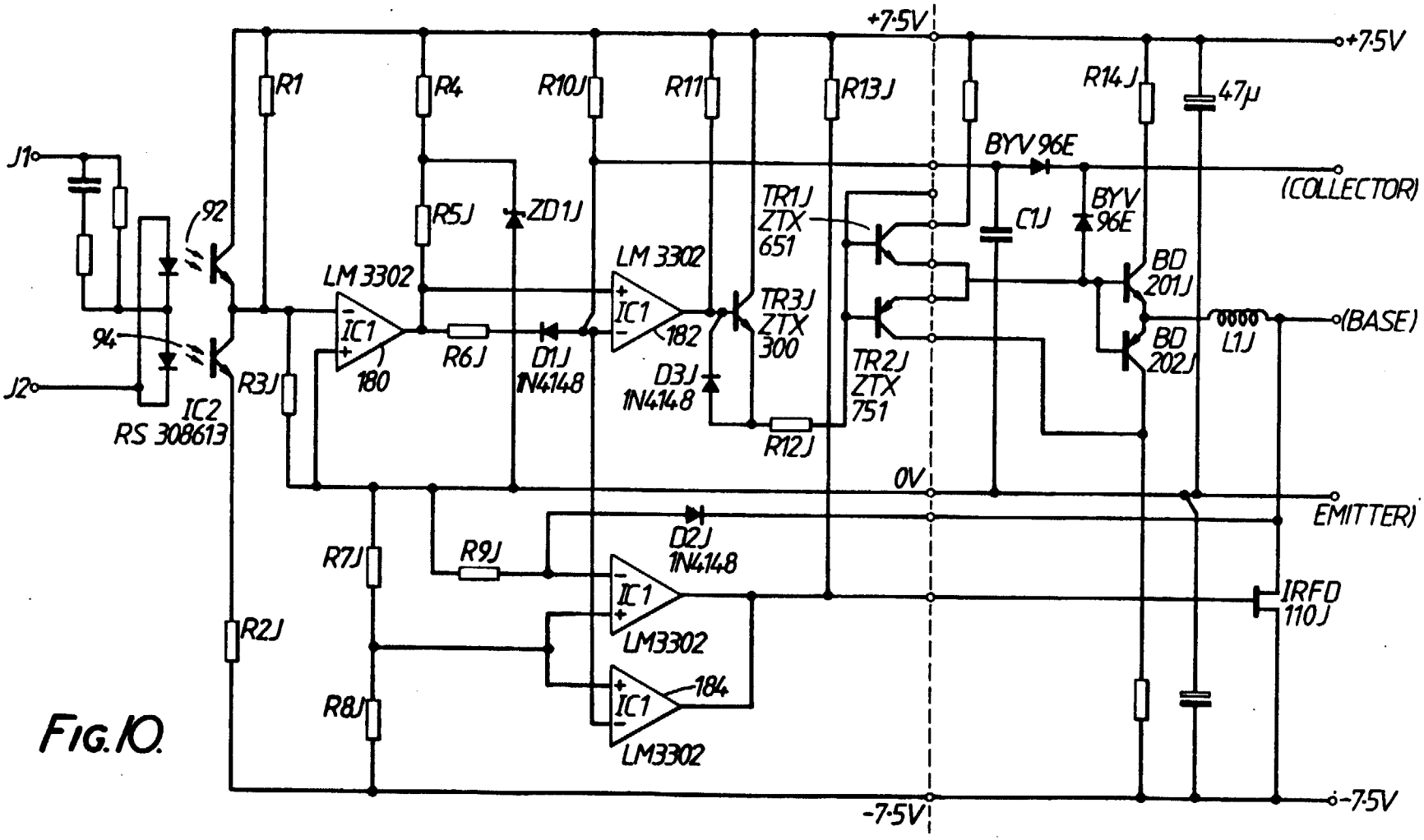
FIG. 10 is a circuit diagram of a regenerative braking drive circuit incorporated in the circuit of FIG. 1.

A braking power transistor drive circuit is illustrated schematically in FIG. 10 in which the layout of the components is essentially the same as that of the motor drive curcuit in FIG. 9. The braking signals are received between pins J1 and J2. A flywheel choke L1J is connected to the negative rail through an FET transistor IRFD110J. However, in comparison with the circuit of FIG. 9, the various components, such as the flywheel choke L1J and a resistor R14J are of a smaller power rating as they do not have to withstand such large current values as do those in the motor drive circuit.

Figure 11:
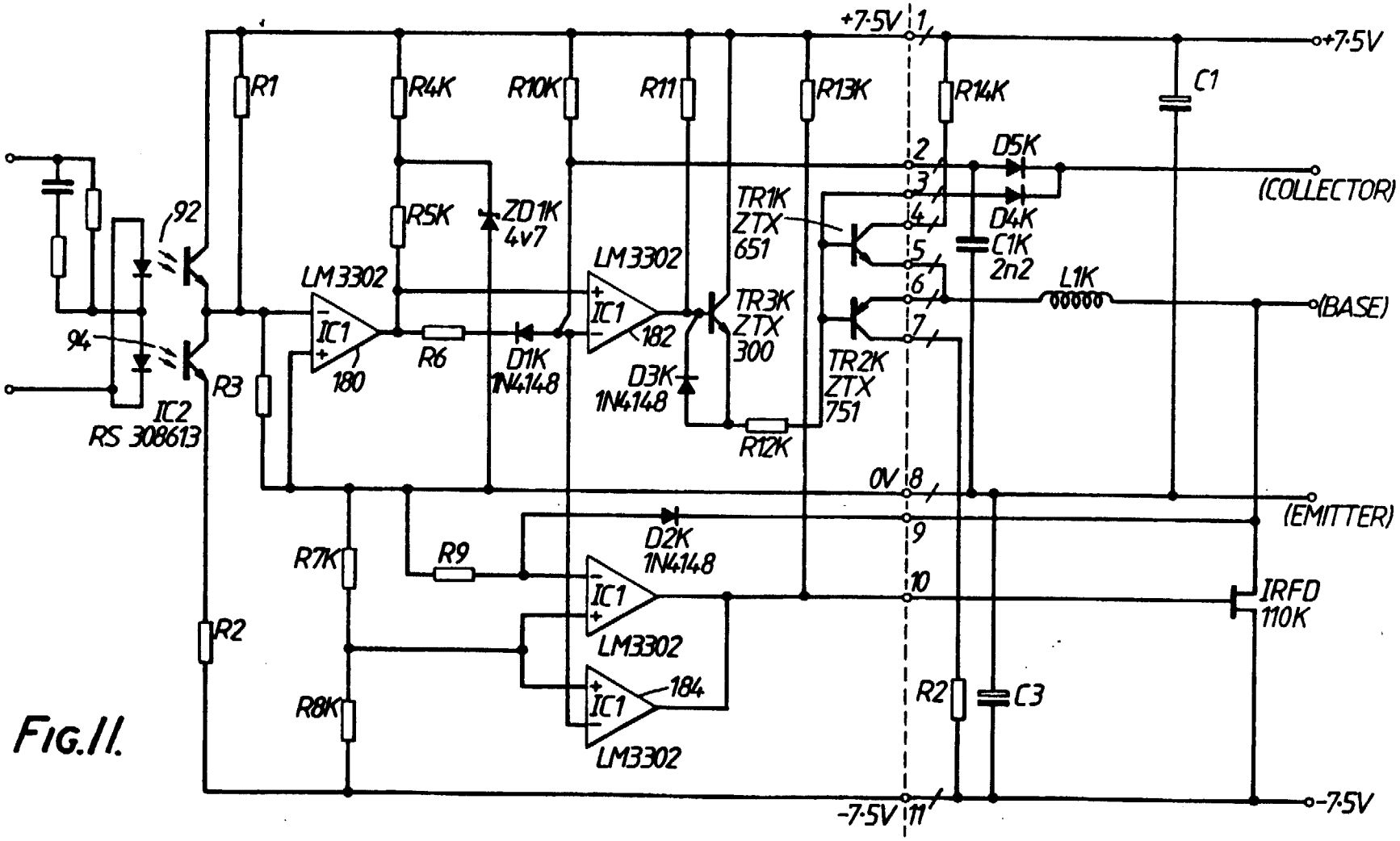
FIG. 11 is a circuit diagram of a field drive circuit incorporated in the circuit of FIG. 1.

As with the motor and braking power transistors 14 and 16, each field transistor 18 also requires its own independent drive circuit. As with the braking transistor drive circuit each separate field transistor drive circuit is essentially the same as the motor power transistor drive circuit. One of the field transistor drive circuits is illustrated schematically in FIG. 11 of the drawings. Again, the current demands on the components of the drive circuit are significantly lower in comparison to both the motor and braking transistor drive circuits and, for example, the flywheel choke L1K and resistor R14K are of appropriately lower power ratings.

The output from between a complimentarily coupled pair of transistors TR1K and TR2K is applied directly to the left hand side of a flywheel choke L1K. A diode D4K, equivalent to the diode D4H is connected to the base of the NPN transistor TR1K and the PNP transistor TR2K.

Figure 12:
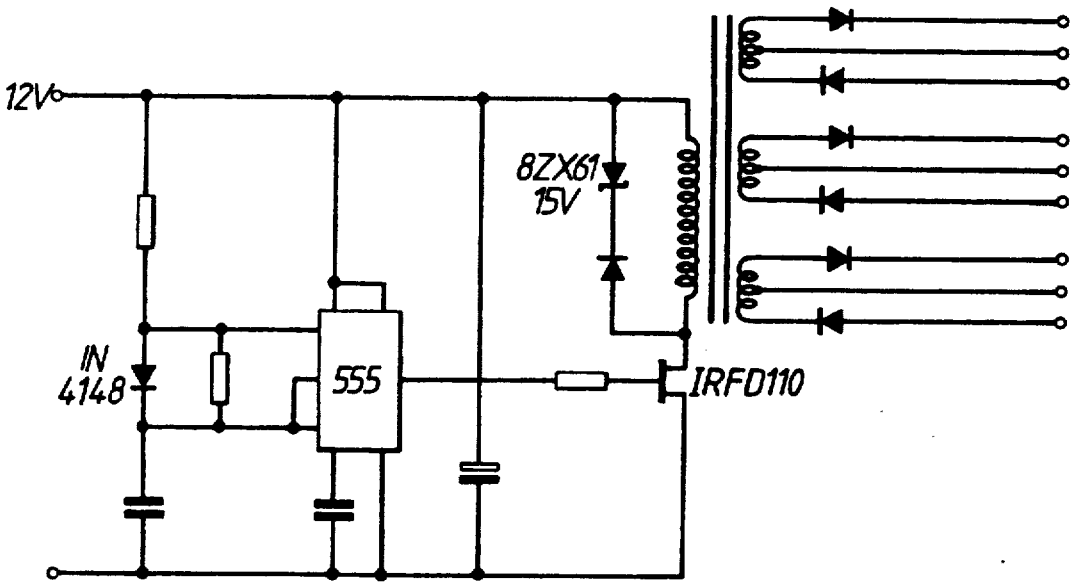
FIG. 12 is a circuit diagram of a power supply unit for supplying the circuit of FIG. 11.

Referring to FIG. 12 of the drawings a field transistor power supply unit is illustrated schematically. The power supply unit provides both positive and negative voltages for the full bridge connected field transistors 18. In this regard, it is necessary to supply a floating voltage level to the two field transistors illustrated at the top of the full bridge connected transistors 18 in drawing of FIG. 1.

The main traction battery voltage is 216 volts from this are derived a ±12 volts circuit supply which is applied to a regulator to create a steady ±7.05 volts supply for the controller circuits. In addition to this there are two separate ±7.5 volts supplies derived for each of the motoring and braking power transistors, three separate ±7.5 volts field power supplies and a ±12 volts supply to drive the machine contactors.

We claim:

1. An electric load controller, comprising control means and switch means selectively operable in response to control signals to control the supply of power to a load, the control means being operable to initiate a test procedure prior to the supply of power to the load, the test procedure including means for applying power across the switch means, the control means including switch test means connected to monitor current through the switch during said test procedure, said control means being responsive to signals from said switch test means to inhibit application of power to the load at times when said monitored current indicates the switch means is faulty.

2. The controller of claim 1 wherein said switch test means is operable in response to signal current.

3. The controller of claim 2 wherein said switch test means is responsive to excessive leakage current in said first and second switch means.

4. The controller of claim 1 further comprising test means connected across said first switch means, said test means inhibiting said supply of power to the load at times when the voltage across the lead is below a predetermined value.

5. The controller of claim 1 wherein said test procedure includes supplying power to said switch means by said control means, said switch test means being operative to monitor the condition of said switch means at times when the power is applied across the control means to determine whether said switch means is faulty.

6. The controller of claim 5 wherein said switch means is isolated from the load during said start-up procedure.

7. The controller of claim 1 wherein the load is an electric motor, and the controller further comprises second switch means connected to said first switch means, said first and second switch means being selectively operable, in response to said control signals, to control electrically at least one of the driving and braking of the electric motor.

8. The controller of claim 7 wherein said first and second switch means are connected in series.

9. The controller of claim 8 wherein the switch test means is connected to monitor the current through the switch means by monitoring the voltage between said first and second switch means.

10. The controller of claim 9 wherein said switch test means inhibits said supply of power to the load at times when said monitored voltage falls outside specified limits.

11. The controller of claim 10 wherein said specified limits are in the range of 40% to 60% of the voltage across said power supply.

12. The controller, of claim 9 wherein a resistor bypass means is connected across each said respective first and second switch means for deriving said voltage across said power supply.

* * * * *

UNITED STATES PATENT AND TRADEMARK OFFICE

CERTIFICATE OF CORRECTION

PATENT NO. : Re. 34,159

DATED : January 12, 1993

INVENTOR(S) : Christopher HARRINGTON et al.

It is certified that error appears in the above-identified patent and that said Letters Patent is hereby corrected as shown below:

IN THE CLAIMS

Claim 4, column 21, line 1, "lead" should read --load--.

Claim 7, column 21, line 14, after "first" insert --named--.

Signed and Sealed this

Fifth Day of July, 1994

Bruce Lehman

*Attest:*

BRUCE LEHMAN

*Attesting Officer*

*Commissioner of Patents and Trademarks*